US012046193B2

(12) United States Patent
Yang et al.

(10) Patent No.: US 12,046,193 B2
(45) Date of Patent: Jul. 23, 2024

(54) VARIABLE FRAME RATE DISPLAY SYSTEM

(71) Applicant: SAMSUNG ELECTRONICS CO., LTD., Suwon-si (KR)

(72) Inventors: Hoonmo Yang, Hwaseong-si (KR); Sungchul Yoon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 60 days.

(21) Appl. No.: 17/835,756

(22) Filed: Jun. 8, 2022

(65) Prior Publication Data

US 2023/0136120 A1     May 4, 2023

(30) Foreign Application Priority Data

Oct. 29, 2021    (KR) ........................ 10-2021-0146488

(51) Int. Cl.
*G09G 3/30*     (2006.01)
*G09G 3/3225*     (2016.01)
*G09G 3/36*     (2006.01)
*G09G 5/39*     (2006.01)

(52) U.S. Cl.
CPC ............ *G09G 3/3225* (2013.01); *G09G 5/39* (2013.01); *G09G 2330/021* (2013.01); *G09G 2340/0435* (2013.01); *G09G 2360/18* (2013.01)

(58) Field of Classification Search
CPC .. G09G 3/3225; G09G 5/39; G09G 2330/021; G09G 2340/0435; G09G 2360/18
See application file for complete search history.

(56) References Cited

U.S. PATENT DOCUMENTS

| 7,844,842 | B2 | 11/2010 | Fard et al. |
| 9,318,069 | B2 | 4/2016 | Nambi et al. |
| 9,378,697 | B2 | 6/2016 | Fujioka et al. |
| 9,501,993 | B2 | 11/2016 | Nambi et al. |
| 9,589,540 | B2 | 3/2017 | Wu et al. |
| 10,019,968 | B2 | 7/2018 | Bi et al. |
| 10,032,430 | B2 | 7/2018 | Huang et al. |
| 10,056,050 | B2 | 8/2018 | Nambi et al. |
| 10,237,516 | B2 | 3/2019 | Kabuto |
| 10,592,021 | B2 | 3/2020 | Tripathi et al. |
| 10,600,379 | B2 | 3/2020 | Nambi et al. |
| 2014/0198093 | A1 | 7/2014 | Nambi et al. |
| 2017/0249920 | A1* | 8/2017 | Cook ..................... G09G 5/363 |
| 2018/0158386 | A1* | 6/2018 | Zhang ................. G09G 3/3225 |
| 2018/0374416 | A1 | 12/2018 | Hou et al. |
| 2019/0164518 | A1* | 5/2019 | Dimitrov ............... G09G 5/393 |

FOREIGN PATENT DOCUMENTS

| JP | 6554429 A | 8/2017 |
| KR | 1774127 | 8/2017 |
| KR | 10019968 B1 | 9/2017 |

\* cited by examiner

*Primary Examiner* — Sanghyuk Park
(74) *Attorney, Agent, or Firm* — Fish & Richardson P.C.

(57) ABSTRACT

An application processor includes a main processor and a display controller controlled by the main processor. The display controller controls a display device that is located outside the application processor and operates based on a variable frame rate scheme, receives an event signal associated with a frame update of the display device, adjusts a frame rate of the display device based on the event signal, records timing information associated with the frame update of the display device based on the event signal, and provides the timing information to the main processor.

18 Claims, 17 Drawing Sheets

FIG. 11

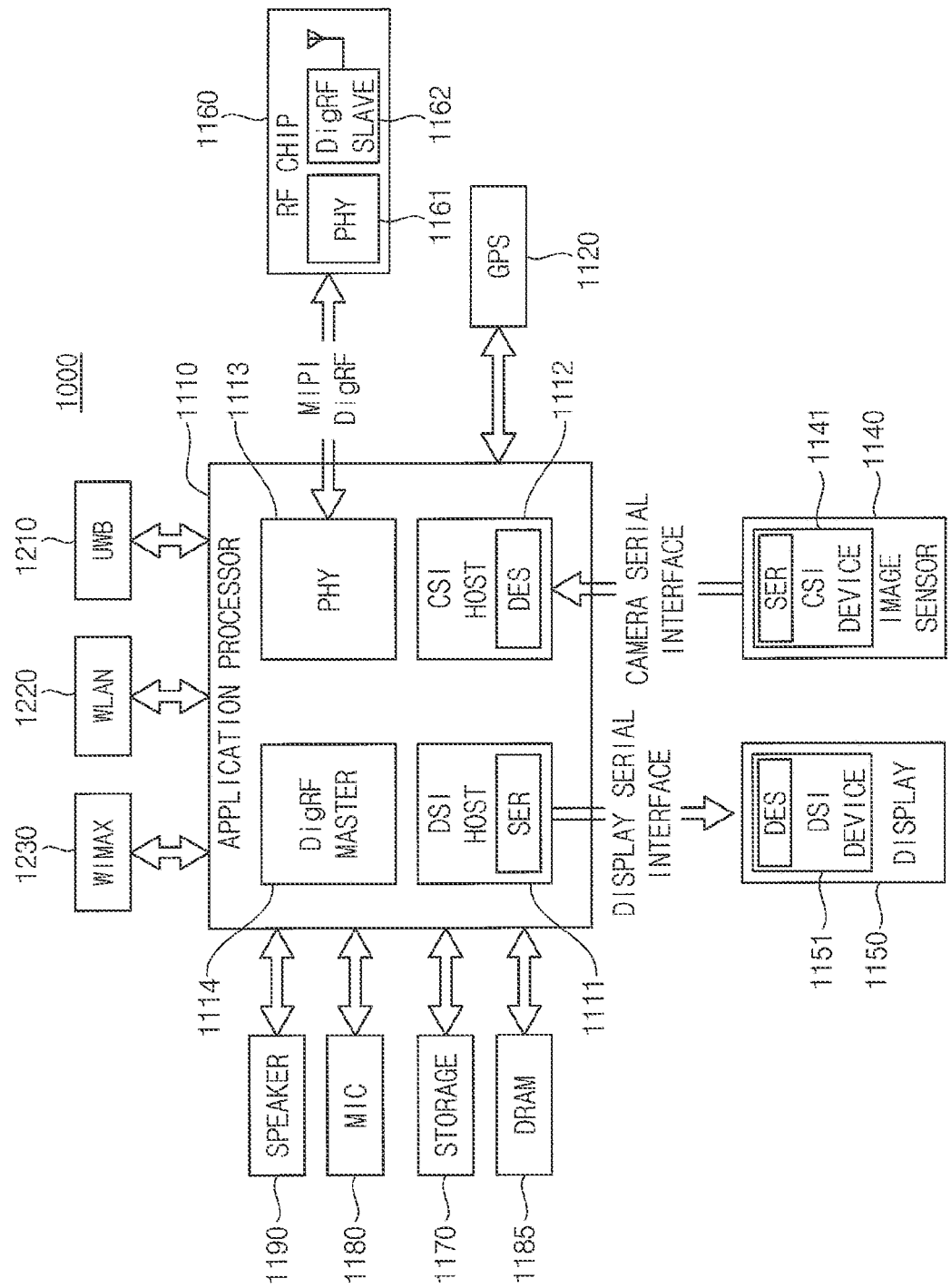

VARIABLE FRAME RATE DISPLAY SYSTEM

CROSS-REFERENCE TO RELATED APPLICATION

This application claims priority under 35 USC § 119 to Korean Patent Application No. 10-2021-0146488 filed on Oct. 29, 2021, in the Korean Intellectual Property Office (KIPO), the contents of which are herein incorporated by reference in their entirety.

BACKGROUND

1. Technical Field

Example embodiments relate generally to semiconductor integrated circuits and, more particularly, to application processors for variable frame rate and display systems including the application processors.

2. Description of the Related Art

As information technology is developed, a display device becomes important to provide information to a user. Various display devices such as liquid crystal displays (LCDs), plasma displays, and electroluminescent displays have gained popularity. Among these, electroluminescent displays have quick response speeds and reduced power consumption using light-emitting diodes (LEDs) or organic light-emitting diodes (OLEDs) that emit light through recombination of electrons and holes. Recently, as display technologies have been developed, display devices having a variable frame rate in which: (1) a plurality of frame rates are supported rather than only a single/fixed frame rate and (2) a frame rate is changed in real time have been researched and various methods for driving and/or controlling the display devices having variable frame rate have been researched.

SUMMARY

At least one example embodiment of the present disclosure provides an application processor capable of efficiently implementing a variable frame rate by recording and providing display monitoring information.

At least one example embodiment of the present disclosure provides a display system including the application processor.

According to example embodiments, an application processor includes a main processor and a display controller controlled by the main processor. The display controller controls a display device that is located outside the application processor and operates based on a variable frame rate scheme, receives an event signal associated with a frame update of the display device, adjusts a frame rate of the display device based on the event signal, records timing information associated with the frame update of the display device based on the event signal, and provides the timing information to the main processor.

According to example embodiments, a display system includes a display device and an application processor. The display device operates based on a variable frame rate scheme. The application processor communicates with the display device. The application processor includes a main processor and a display controller controlled by the main processor. The display controller controls the display device, receives an event signal associated with a frame update of the display device, adjusts a frame rate of the display device based on the event signal, records timing information associated with the frame update of the display device based on the event signal, and provides the timing information to the main processor.

According to example embodiments, an application processor includes a main processor, a graphic processor and a display controller. The main processor generates image data. The graphic processor generates rendering data by rendering the image data and generates rendering information associated with a rendering operation. The display controller is controlled by the main processor. The display controller controls a display device that is located outside the application processor and operates based on a variable frame rate scheme, generates frame data based on the rendering data, transmits the frame data to the display device, receives an event signal associated with a frame update of the display device from the display device, generates a frame rate control signal used to adjust a frame rate of the display device based on an event signal, transmits the frame rate control signal to the display device, records timing information associated with the frame update of the display device based on the event signal, and provides the timing information to the main processor. The main processor generates a performance/power control signal used to perform at least one of a performance control and a power control by comparing the timing information with the rendering information. In response to a rendering rate of the graphic processor being slower than the frame rate of the display device, the main processor performs the performance control such that the rendering rate of the graphic processor is increased. In response to the rendering rate of the graphic processor being faster than the frame rate of the display device, the main processor performs the power control such that power consumption of the application processor is reduced.

In the application processor and the display system according to example embodiments, the display controller may provide the timing information, which represents the currently displayed hardware states and/or conditions, to the main processor and/or the operating system (e.g., software) executed by the main processor. Using the timing information, the main processor may change the frame rate of the display device and may also perform the performance optimization (e.g., the rendering performance of the graphic processor) and/or the power optimization. Accordingly, the optimization for the variable frame rate scheme of the display device may be supported and the fine-grained frame rate change may be implemented.

BRIEF DESCRIPTION OF THE DRAWINGS

Illustrative, non-limiting example embodiments will be more clearly understood from the following detailed description taken in conjunction with the accompanying drawings.

FIGS. 10 and 11 are block diagrams illustrating an application processor and a display system including the application processor according to example embodiments.

FIG. 19 is a block diagram illustrating an electronic system including a display system according to example embodiments.

DETAILED DESCRIPTION OF THE EMBODIMENTS

Figure 1:
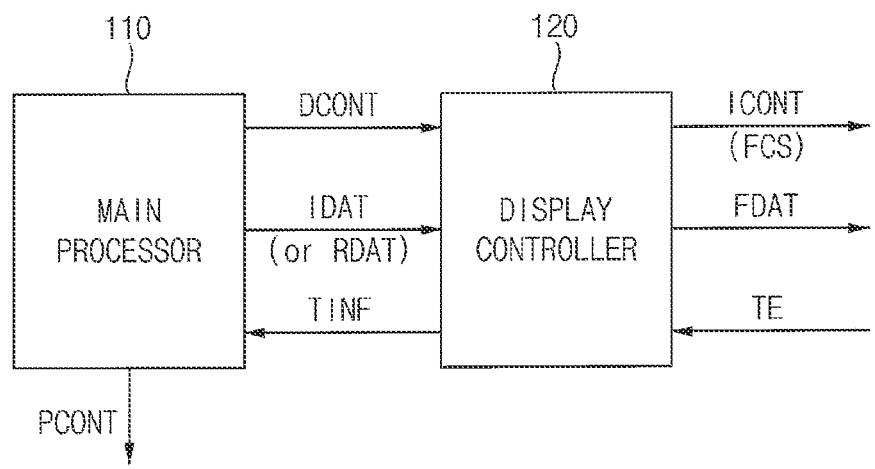
FIG. 1 is a block diagram illustrating an application processor according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating an application processor according to example embodiments.

Referring to FIG. 1, an application processor (AP) 100 includes a main processor 110 and a display controller 120.

The application processor 100 controls overall operations of a system including the application processor 100. For example, as will be described with reference to FIG. 2, the application processor 100 may be included in a display system (e.g., a display system 200 of FIG. 2), and may control overall operations of the display system. The application processor 100 may be referred to as a host processor.

In some example embodiments, the application processor 100 may be implemented in the form of a system-on-chip (SoC).

The main processor 110 controls an overall operation of the application processor 100. For example, the main processor 110 may execute an operating system (OS). For example, the operating system may include a file system for file management, a device driver for controlling peripheral devices including a display device (e.g., a display device 300 in FIG. 2) at the operating system level, or the like. For example, the main processor 110 may include at least one of various processing units, e.g., a central processing unit (CPU), or the like.

The display controller 120 is controlled by the main processor 110 and controls an operation of the display device included in the display system. For example, the main processor 110 may generate a display control signal DCONT for controlling the display controller 120 and image data IDAT used to generate frame data FDAT. For example, the image data IDAT may be provided directly to the display controller 120 as it is or the image data IDAT may be rendered by a graphic processor (e.g., a graphic processor 140 in FIG. 6) and may be provided to the display controller 120 as rendering data RDAT. For example, the display controller 120 may generate a control signal ICONT and the frame data FDAT based on the display control signal DCONT and based on the image data IDAT or the rendering data RDAT. The control signal ICONT and the frame data FDAT may be provided to the display device. The display controller 120 may be referred to as a display processing unit (DPU).

As will be described with reference to FIG. 3, the display device may operate and/or may be driven based on a variable frame rate scheme in which a frame rate (or refresh rate) is not fixed and is changeable or variable. A frame rate may represent or correspond to the number of frame images displayed on the display device during a unit time interval. The variable frame rate scheme may be referred to as a variable refresh rate (VRR) scheme, an adaptive refresh rate (ARR) scheme, or the like.

To implement the above-described variable frame rate scheme, the display controller 120 receives an event signal TE associated with or related to a frame update of the display device and adjusts or controls a frame rate of the display device based on the event signal TE. For example, the control signal ICONT that is provided from the display controller 120 to the display device may include a frame rate control signal FCS for adjusting the frame rate of the display device.

In some example embodiments, the event signal TE associated with the frame update of the display device may be received from the display device. In other example embodiments, when the display device does not transmit the event signal TE associated with the frame update of the display device to the application processor 100, a timing signal corresponding to the frame update of the display device may be internally generated within the application processor 100 and the timing signal may be provided as the event signal TE. In other words, the event signal TE may be generated and/or provided outside (e.g., from the display device) or inside the application processor 100.

In addition, to efficiently implement the above-described variable frame rate scheme, the display controller 120 records and provides display monitoring information and/or display hardware information for the variable frame rate scheme. For example, the display controller 120 records timing information TINF associated with or related to the frame update of the display device based on the event signal TE and provides the timing information TINF to the main processor 110. Configurations and operations of recording and providing the timing information TINF will be described in detail with reference to FIGS. 4 and 5.

In some example embodiments, the main processor 110 may perform at least one of a performance control and a power control based on the timing information TINF. For example, the main processor 110 may generate a performance/power control signal PCONT used to perform the at least one of the performance control and the power control based on the timing information TINF. Examples of the performance control and the power control will be described in detail with reference to FIGS. 6 through 9.

Figure 2:
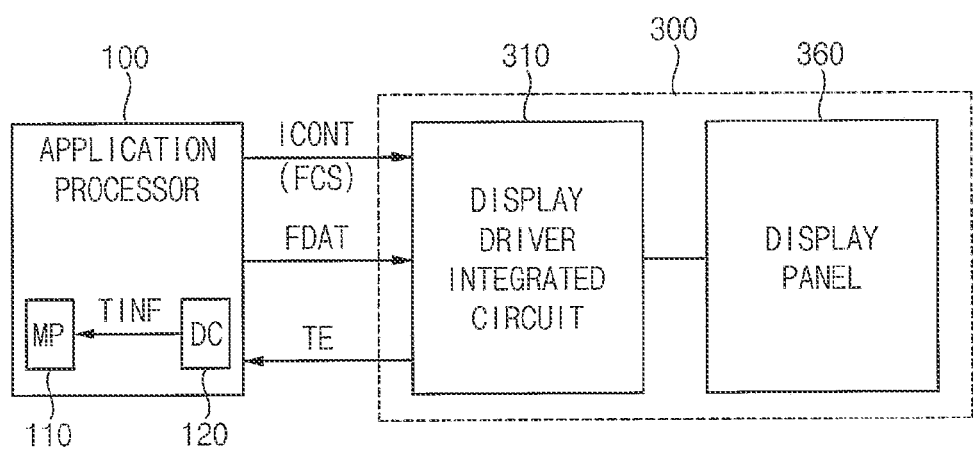
FIG. 2 is a block diagram illustrating an application processor and a display system including the application processor according to example embodiments.

FIG. 2 is a block diagram illustrating an application processor and a display system including the application processor according to example embodiments.

Referring to FIG. 2, a display system 200 includes an application processor 100 and a display device 300.

The application processor 100 may be the application processor according to example embodiments and may be substantially the same as the application processor 100 of FIG. 1. The application processor 100 includes a main processor (MP) 110 and a display controller (DC) 120. The application processor 100 transmits a control signal ICONT and frame data FDAT to the display device 300 and receives an event signal TE. For example, the event signal TE may be received from the display device 300. The display controller 120 generates timing information TINF based on the event signal TE and transmits the timing information TINF to the main processor 110.

The display device 300 includes a display driver integrated (DDI) circuit 310 and a display panel 360.

The display driver integrated circuit 310 controls an operation of the display device 300. For example, the display driver integrated circuit 310 may receive the control signal ICONT and the frame data FDAT from the application processor 100 and may control the display panel 360 based on the control signal ICONT such that frame images corresponding to the frame data FDAT are displayed on the display panel 360. In addition, the display driver integrated circuit 310 may transmit the event signal TE to the application processor 100. For example, the event signal TE may include a tearing effect signal.

The display panel 360 may perform an image display operation (e.g., may display the frame images) based on or under a control of the display driver integrated circuit 310.

Examples of the display device 300, the display driver integrated circuit 310, and the display panel 360 will be described in detail with reference to FIGS. 12 and 13.

Although FIG. 2 illustrates an example where the event signal TE is generated and/or provided outside the application processor 100 (e.g., from the display device 300), example embodiments are not limited thereto. For example, the event signal TE may be generated and/or provided inside the application processor 100.

Figure 3:
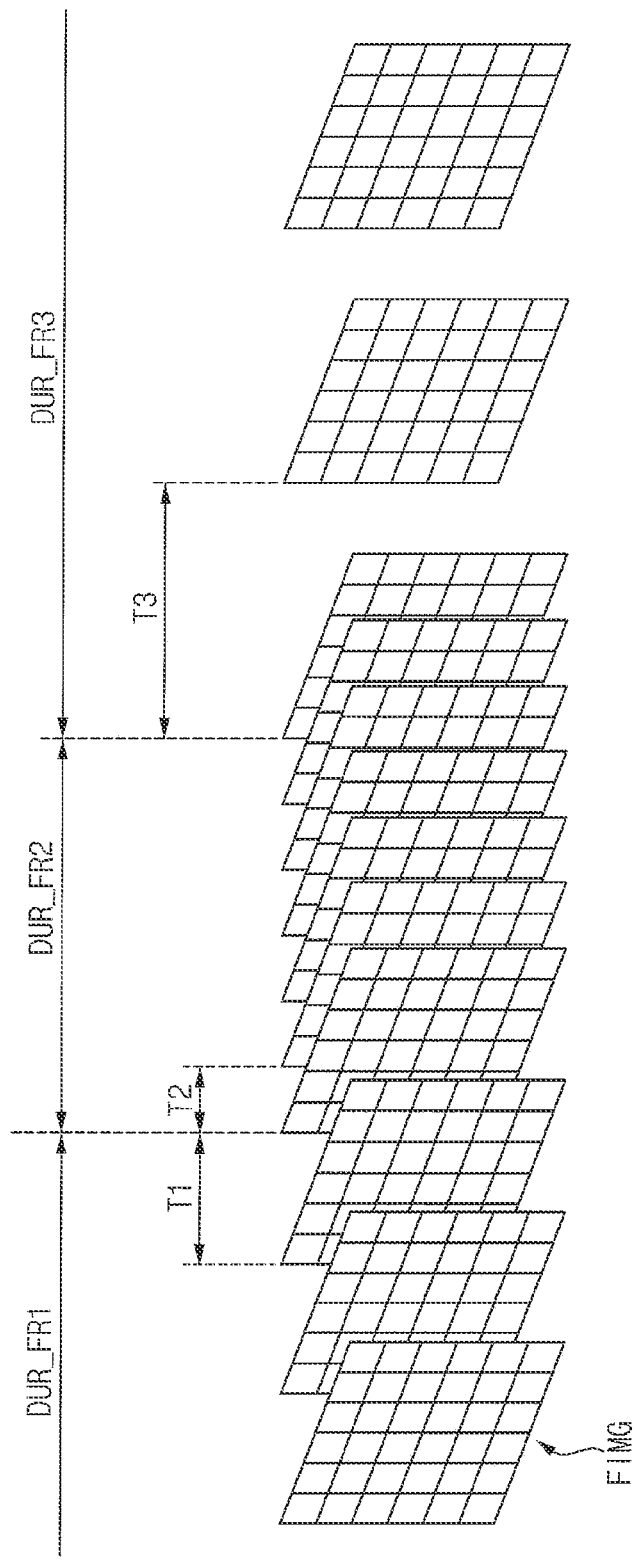
FIG. 3 is a diagram for describing an operation of a display device included in a display system according to example embodiments.

FIG. 3 is a diagram for describing an operation of a display device included in a display system according to example embodiments.

Referring to FIG. 3, an example of frame images FIMG displayed on the display device 300 over time is illustrated.

As described with reference to FIG. 1, the display device 300 may operate and/or may be driven by the variable frame rate scheme in which the frame rate is changeable or variable under a control of the display controller 120 (e.g., based on the frame rate control signal FCS).

For example, during a first operation phase DUR_FR1, the display device 300 may display the frame images FIMG based on a first frame rate (or a first driving frequency). During a second operation phase DUR_FR2 subsequent to the first operation phase DUR_FR1, the display device 300 may display the frame images FIMG based on a second frame rate (or a second driving frequency). During a third operation phase DUR_FR3 subsequent to the second operation phase DUR_FR2, the display device 300 may display the frame images FIMG based on a third frame rate (or a third driving frequency). In the first operation phase DUR_FR1, a reciprocal of a first time interval T1 between the frame images FIMG may correspond to the first frame rate. In the second operation phase DUR_FR2, a reciprocal of a second time interval T2 between the frame images FIMG may correspond to the second frame rate. In the third operation phase DUR_FR3, a reciprocal of a third time interval T3 between the frame images FIMG may correspond to the third frame rate. For example, FIG. 3 illustrates that the first time interval T1 is longer than the second time interval T2 and is shorter than the third time interval T3 and, thus, the first frame rate is slower or lower than the second frame rate and is faster or higher than the third frame rate. However, example embodiments are not limited thereto.

In addition, FIG. 3 illustrates that all of the frame images FIMG may have the same resolution (e.g., a first resolution). For convenience of illustration, a resolution of one frame image is illustrated by the number of small squares included in the one frame image.

Figure 4:
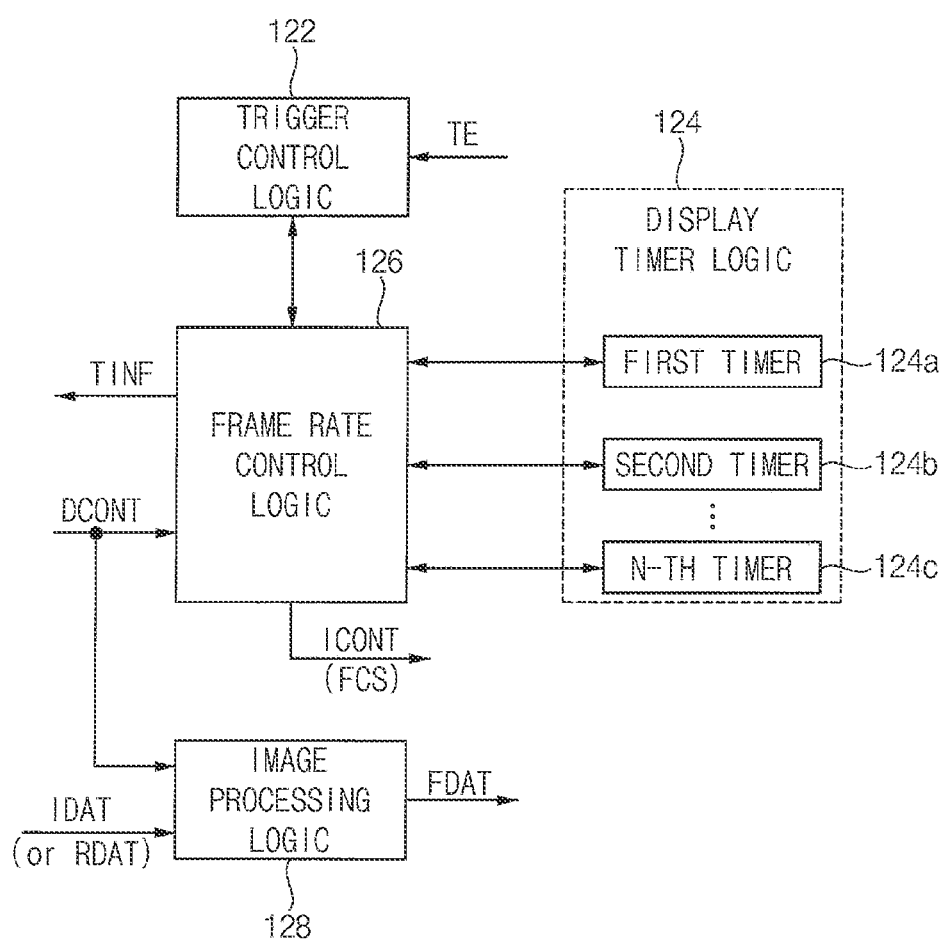
FIG. 4 is a block diagram illustrating an example of a display controller included in an application processor according to example embodiments.

FIG. 4 is a block diagram illustrating an example of a display controller included in an application processor according to example embodiments.

Referring to FIG. 4, a display controller 120 may include a trigger control logic 122, a display timer logic 124 and a frame rate control logic 126. The display controller 120 may further include an image processing logic 128.

The trigger control logic 122 may detect an event source. For example, the event source may include the event signal TE received from the display device 300, and the trigger control logic 122 may detect the event signal TE. For another example, the event source may include the timing signal generated inside the application processor 100, and the trigger control logic 122 may detect the timing signal as the event signal TE. The trigger control logic 122 may control the frame rate control logic 126 such that an operation of recording the timing information TINF is triggered based on the event signal TE.

The display timer logic 124 may record the timing information TINF based on the event signal TE. The display timer logic 124 may be referred to as an event-driven timer logic.

The display timer logic 124 may include a plurality of timers 124a, 124b and 124c. For example, the plurality of timers 124a, 124b and 124c may include first to N-th timers, where N is a natural number greater than or equal to two.

Each of the plurality of timers 124a, 124b and 124c may measure a respective one of a plurality of time data included in the timing information TINF. For example, one frame interval during which the display device 300 displays one frame image may be divided into a plurality of sub-intervals, each of the plurality of sub-intervals may correspond to a time interval from a start time point to an end time point, and the plurality of timers 124a, 124b and 124c may operate to measure lengths of different sub-intervals among the plurality of sub-intervals associated with the frame interval. For example, each of the plurality of timers 124a, 124b and 124c may include a counter that operates based on a clock signal.

The frame rate control logic 126 may adjust the frame rate of the display device 300 based on the event signal TE. For example, the frame rate control logic 126 may generate the control signal ICONT for controlling the display device 300 based on the event signal TE and the display control signal DCONT provided from the main processor 110, and the control signal ICONT may include the frame rate control signal FCS.

The frame rate control logic 126 may control start timings and end timings of the plurality of timers 124a, 124b and 124c for recording the timing information TINF based on the event signal TE. In addition, the frame rate control logic 126 may allocate each of the plurality of timers 124a, 124b and 124c to at least one of the plurality of sub-intervals such that the plurality of timers 124a, 124b and 124c measure the lengths of the different sub-intervals.

The frame rate control logic 126 may output the timing information TINF. For example, the timing information TINF may include vertical synchronization time information (e.g., Tvsync), skew time information (e.g., Tskew), scan-out time information (e.g., Tscanout), or the like. As described with reference to FIG. 1, the timing information TINF may be provided to the main processor 110 and the main processor 110 may generate the performance/power control signal PCONT based on the timing information TINF.

In some example embodiments, although not illustrated in detail, the timing information TINF may be stored into a register included in the display controller 120 and software such as the operating system executed by the main processor 110 may obtain the timing information TINF by reading values of the register. In other example embodiments, the timing information TINF may be implemented as a separate signal transmitted through a physical interface.

The image processing logic 128 may generate the frame data FDAT based on the display control signal DCONT and based on the image data IDAT or the rendering data RDAT.

In some example embodiments, although not illustrated in detail, the image processing logic 128 may include a blender and a display quality enhancer. The blender may generate image data by blending a plurality of layer data that corresponds to a plurality of images to be displayed on one screen in the display device 300. The display quality enhancer may perform at least one display quality enhancement algorithm on image data.

Blending represents an operation of calculating a pixel value that is actually displayed among several layers (e.g., images) constituting one screen. When the blending is performed, a pixel value that is actually displayed on each pixel may be obtained. For example, when only one layer is disposed, arranged or placed on a pixel, a pixel value included in the one layer may be obtained as it is. When two or more layers are disposed on a pixel, a pixel value included in one layer among the two or more layers may be obtained or a new pixel value may be obtained based on pixel values included in the two or more layers. The blending may be referred to as mixing and/or composition.

In some example embodiments, the at least one display quality enhancement algorithm may include a detail enhancement (DE), a scaling (or scaler), an adaptive tone map control (ATC), a hue saturation control (HSC), a gamma and a de-gamma, an Android open source project (AOSP), a color gamut control (CGC), a dithering (or dither), a round corner display (RCD), a sub-pixel rendering (SPR), or the like. The DE may represent an algorithm for sharpening an outline of an image. The scaling may represent an algorithm that changes a size of an image. The ATC may represent an algorithm for improving the outdoor visibility. The HSC may represent an algorithm for improving the hue and saturation for color. The gamma may represent an algorithm for gamma correction or compensation. The AOSP may represent an algorithm for processing an image conversion matrix (e.g., a mode for a color-impaired person or a night mode) defined by the Android OS. The CGC may represent an algorithm for matching color coordinates of a display panel. The dithering may represent an algorithm for expressing the effect of color of high bits using limited colors. The RCD may represent an algorithm for processing rounded corners of a display panel. The SPR may represent an algorithm for increasing the resolution. However, example embodiments are not limited thereto, and the at least one display quality enhancement algorithm may further include various other algorithms.

In some example embodiments, at least some components of the display controller 120 may be implemented as hardware. For example, at least some components of the display controller 120 may be included in a computer-based electronic system. In other example embodiments, at least some components of the display controller 120 may be implemented as instruction codes or program routines (e.g., a software program). For example, the instruction codes or the program routines may be executed by a computer-based electronic system and may be stored in any storage device located inside or outside the computer-based electronic system.

Figure 5:
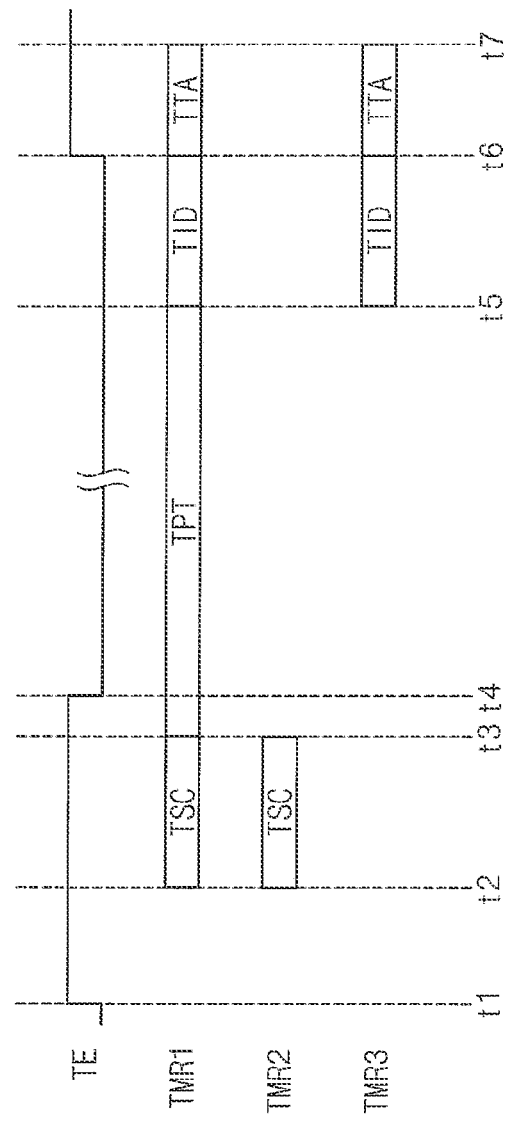
FIG. 5 is a diagram for describing an operation of a display controller included in an application processor according to example embodiments.

FIG. 5 is a diagram for describing an operation of a display controller included in an application processor according to example embodiments.

Referring to FIG. 5, an example of the event signal TE received by the display controller 120 is illustrated and an example of operations of timers TMR1, TMR2 and TMR3 included in the display controller 120 based on the event signal TE is illustrated.

The event signal TE may be activated at time point t1 and may be deactivated at time point t4. While the event signal TE is activated, the display device 300 may allow a start of a frame image. For example, during an activation period of the event signal TE, e.g., during a time interval between time points t1 and t4 during which the event signal TE has a logic high level, the display device 300 may start to display the frame image. In addition, the event signal TE may be activated again at time point t6, and a time interval between time points t1 and t6 may represent a cycle (or period) of the event signal TE.

In some example embodiments, the variable frame rate scheme may be implemented by differently setting a start time point for each frame image within the activation period of the event signal TE (e.g., the time interval between time points t1 and t4), while fixing a length of the activation period of the event signal TE and the cycle of the event signal TE (e.g., the time interval between time points t1 and t6). However, example embodiments are not limited thereto, and the variable frame rate scheme may be implemented by changing the length of the activation period of the event signal TE for each frame image or by changing the cycle of the event signal TE for each frame image.

For example, the display device 300 may start the frame image at time point t2 in the time interval between time points t1 and t4. A first time interval TSC between time points t2 and t3 may represent a scanout period corresponding to a latency while the display device 300 operates. A second time interval TPT between time points t3 and t5 may represent a pixel transfer period in which data signals are transmitted to a plurality of pixels (e.g., a plurality of pixels PX in FIG. 12) included in the display panel 360 of the display device 300. The display device 300 may end the frame image at time t5. A third time interval TID between time points t5 to t6 may represent an idle period after the signal transmission is completed and before the event signal TE is activated again.

The event signal TE may be activated again at time point t6. A fourth time interval TTA between time points t6 to t7 may represent a trigger allow period. Although not illustrated in detail, a time interval between time points t1 and t2 may also include a trigger allow period such as the fourth interval TTA.

The time interval between time points t1 and t6 corresponding to one cycle of the event signal TE or a time interval between time points t2 to t7 including the first to fourth time intervals TSC, TPT, TID and TTA may represent one frame period in which the display device 300 displays one frame image. The display device 300 may display a plurality of frame images by repeating a plurality of frame periods, and the variable frame rate scheme may be implemented by differently setting lengths of frame periods depending on the above-described various manners.

In some example embodiments, to record and provide the timing information TINF, the frame rate control logic 126 may allocate the timers TMR1, TMR2 and TMR3 to different time intervals, time measurements may be performed using the timers TMR1, TMR2 and TMR3, the timing information TINF recorded in the timers TMR1, TMR2 and TMR3 as a result of the time measurements may be read and output, and the timers TMR1, TMR2 and TMR3 may be reset (or initialized or cleared).

For example, under a control of the frame rate control logic 126, the timer TMR1 may be allocated to measure a length of the first to fourth time intervals TSC, TPT, TID and TTA, the timer TMR2 may be allocated to measure a length of the first time interval TSC, and the timer TMR3 may be allocated to measure a length of the third and fourth time intervals TID and TTA. In some example embodiments, the allocation of the timers TMR1, TMR2 and TMR3 may be predetermined at an initial operation time (e.g., while the display system 200 is manufactured). In other example embodiments, the allocation of the timers TMR1, TMR2 and TMR3 may be changed in real time (or during runtime) while the display system 200 operates.

In addition, under the control of the frame rate control logic 126, the time measurement using the timer TMR1 may be initiated at time point t2 and the time measurement using the timer TMR1 may be finished at time point t7. Similarly, the time measurement using the timer TMR2 may be initiated at time point t2 and the time measurement using the timer TMR2 may be finished at time point t3. The time measurement using the timer TMR3 may be initiated at time point t5 and the time measurement using the timer TMR3 may be finished at time point t7.

The frame rate control logic 126 may read first timing information corresponding to the length of the first to fourth time intervals TSC, TPT, TID and TTA from the timer TMR1, may read second timing information corresponding to the length of the first time interval TSC from the timer TMR2, may read third timing information corresponding to the length of the third and fourth time intervals TID and TTA from the timer TMR3, may output the timing information TINF including the first, second and third timing information, and may transmit the timing information TINF to the main processor 110. After that, the frame rate control logic 126 may reset the timers TMR1, TMR2 and TMR3 for subsequent time measurements.

In the application processor 100 and the display system 200 according to example embodiments, the event-driven timers of the display controller 120 may be implemented with the plurality of display timers and the event source of the display timers may be allocated to the hardware logic event. In addition, the event source of the display timers may be set as software, the display timers may be driven by software, and values of the display timers may be read and reset by software.

Figure 6:
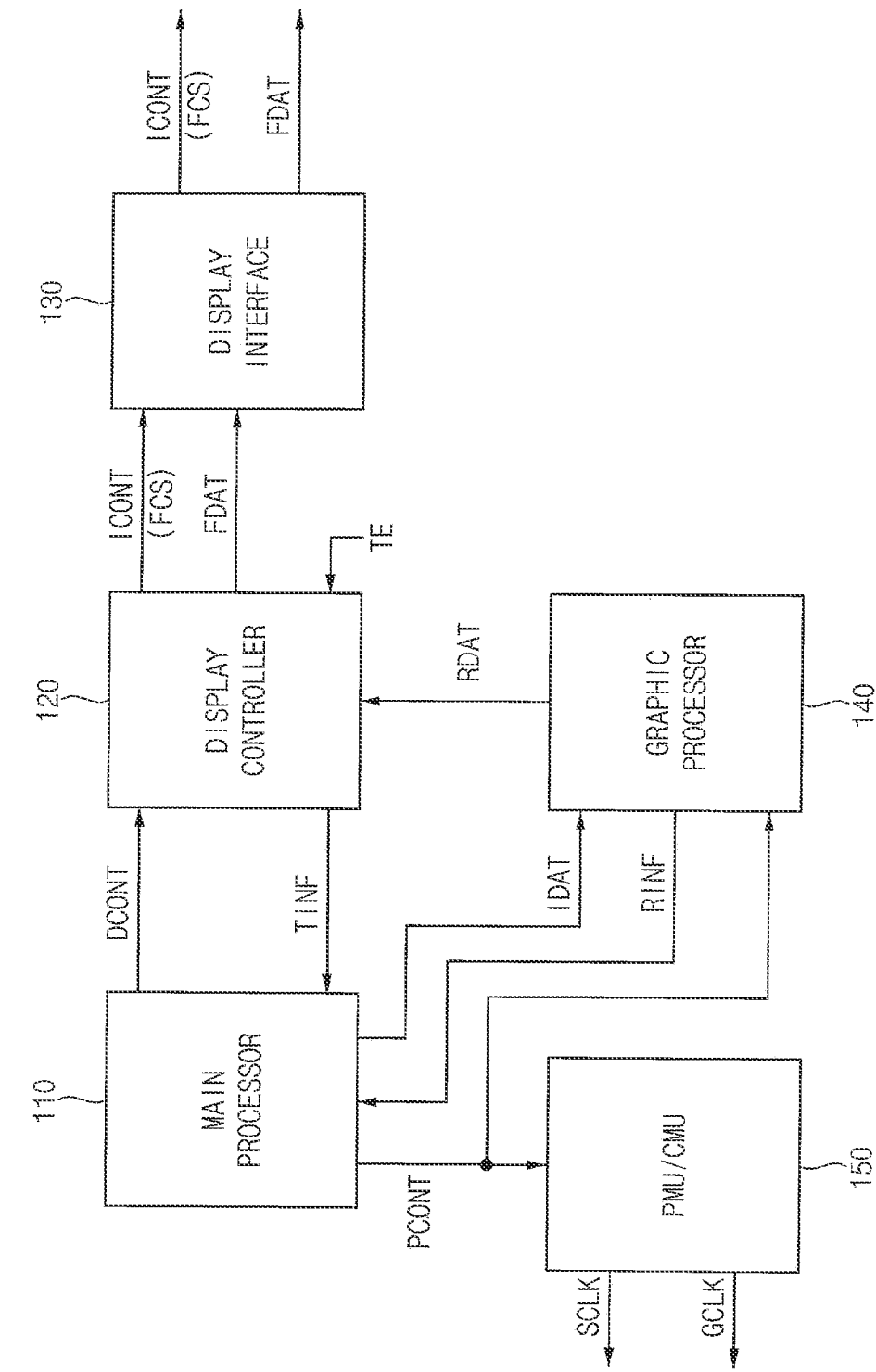
FIG. 6 is a block diagram illustrating an application processor according to example embodiments.

FIG. 6 is a block diagram illustrating an application processor according to example embodiments. The descriptions repeated with FIG. 1 will be omitted.

Referring to FIG. 6, an application processor 102 includes a main processor 110 and a display controller 120. The application processor 102 may further include a display interface 130, a graphic processor 140 and a power management unit and clock management unit (PMU/CMU) 150.

The main processor 110 may be similar to that described with reference to FIG. 1. The main processor 110 may generate a display control signal DCONT and image data IDAT and may generate a performance/power control signal PCONT used to perform a performance control and/or a power control based on timing information TINF and rendering information RINF.

The display controller 120 may be similar to that described with reference to FIG. 1. The display controller 120 may generate a control signal ICONT and frame data FDAT based on the display control signal DCONT and rendering data RDAT and may generate the timing information TINF based on an event signal TE. For example, when the event signal TE is generated and provided outside (e.g., from the display device 300) of the application processor 102, the event signal TE may be received from the display device 300 (e.g., from the display driver integrated circuit 310) through a separate pin and/or channel other than the display interface 130, as will be described with reference to FIGS. 10 and 11. However, example embodiments are not limited thereto, and the event signal TE may be generated and provided inside the application processor 102.

The display interface 130 may be used to communicate with the display device 300. The display interface 130 may transmit the control signal ICONT and the frame data FDAT to the display device 300 (e.g., to the display driver integrated circuit 310).

In some example embodiments, the display interface 130 may be implemented based on one of various display interface standards, e.g., one of a mobile industry processor interface (MIPI), a high definition multimedia interface (HDMI), a display port (DP), a low power display port (LPDP) and an advanced low power display port (ALPDP).

The graphic processor 140 may render frame images displayed on the display device 300. For example, the graphic processor 140 may generate the rendering data RDAT by rendering the image data IDAT and may generate the rendering information RINF associated with a rendering operation. For example, the rendering information RINF may include a rendering rate of the graphic processor 140. For example, the graphic processor 140 may include a graphic processing unit (GPU) or the like.

The power management unit and clock management unit 150 may control, manage, and adjust powers and/or clock signals SCLK and GCLK that are supplied to the application processor 102. For example, the clock signals SCLK and GCLK may include a system driving clock signal SCLK generally used in the application processor 102, a graphic driving clock signal GCLK used in the graphic processor 140, or the like. Although not illustrated in detail, the powers may include a plurality of driving voltages used in the application processor 102.

In some example embodiments, the main processor 110 may perform at least one of the performance control and the power control by comparing the timing information TINF with the rendering information RINF. For example, the main processor 110 may perform at least one of the performance control and the power control by controlling operations of the graphic processor 140 and the power management unit and clock management unit 150 based on the performance/ power control signal PCONT. The performance control and the power control will be described with reference to FIGS. 7 through 9.

Although not illustrated in FIG. 6, the application processor 102 may further include a system bus, a memory, and a plurality of functional modules. The system bus may correspond to a signal transmission path between the components in the application processor 102. The memory may store instructions and data for the operation of the application processor 102. The plurality of functional modules may perform various functions of the host processor.

In some example embodiments, the memory may include a volatile memory, such as a dynamic random access memory (DRAM), a static random access memory (SRAM), or the like. In some example embodiments, the memory may include a nonvolatile memory, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. In some example embodiments, the memory may further include a solid state drive (SSD), a universal flash storage (UFS), a multi-media card (MMC), an embedded multi-media card (eMMC), a secure digital (SD) card, a micro SD card, a memory stick, a chip card, a universal serial bus (USB) card, a smart card, a compact flash (CF) card, or the like.

In some example embodiments, the plurality of functional modules may include a communication module that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, or the like), a camera module that performs a camera function, an input-output (I/O) module that performs a user interface function (e.g., a touch panel module that performs a touch sensing function), and an audio module including a microphone (MIC) module, a speaker module, or the like, that performs an I/O of audio signals. In some example embodiments, the plurality of functional modules may further include a global positioning system (GPS) module, a gyroscope module, or the like.

Figure 7:
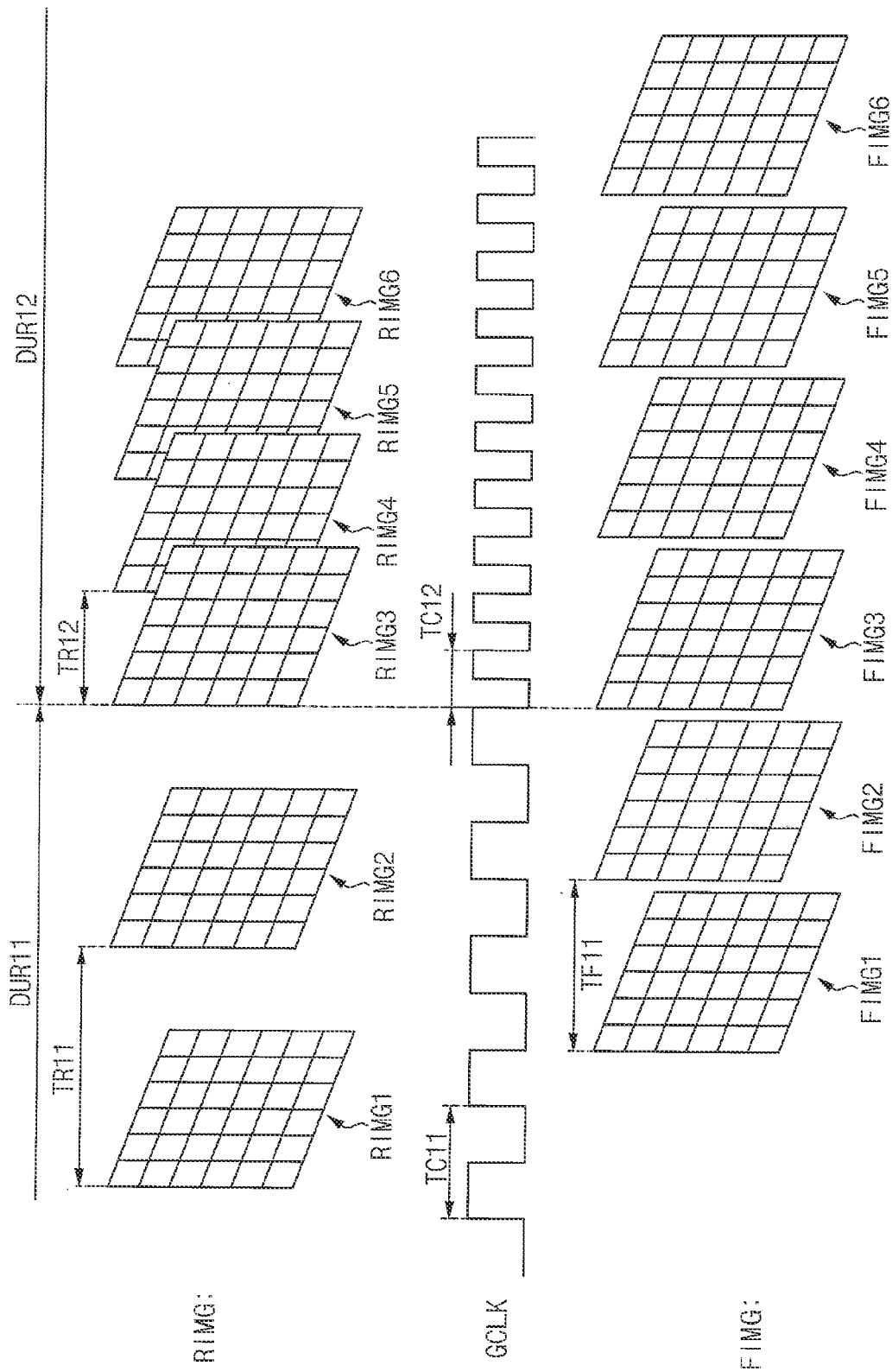
FIGS. 7, 8, and 9 are diagrams for describing an operation of an application processor according to example embodiments.
Figure 8:
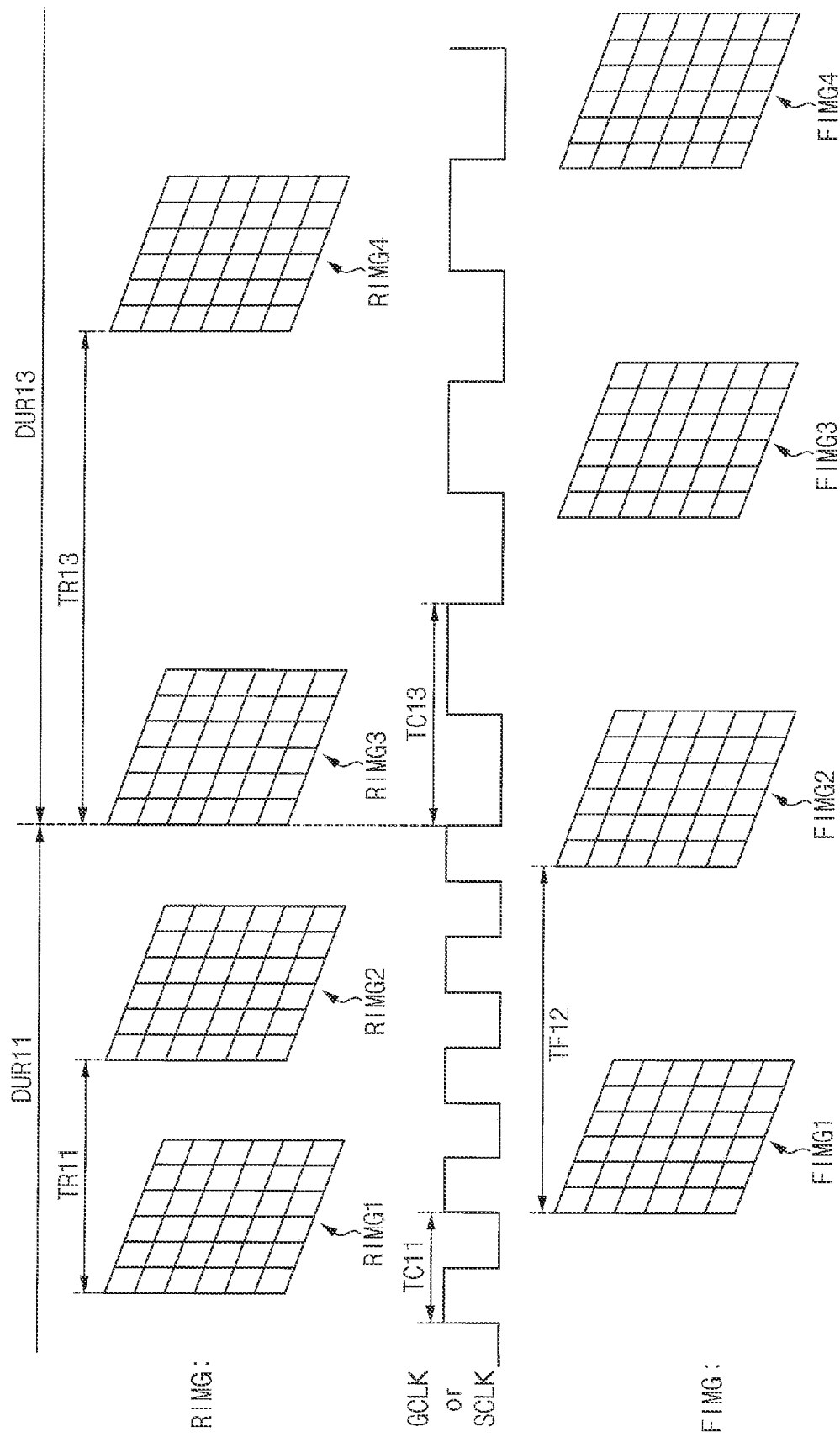
Figure 9:
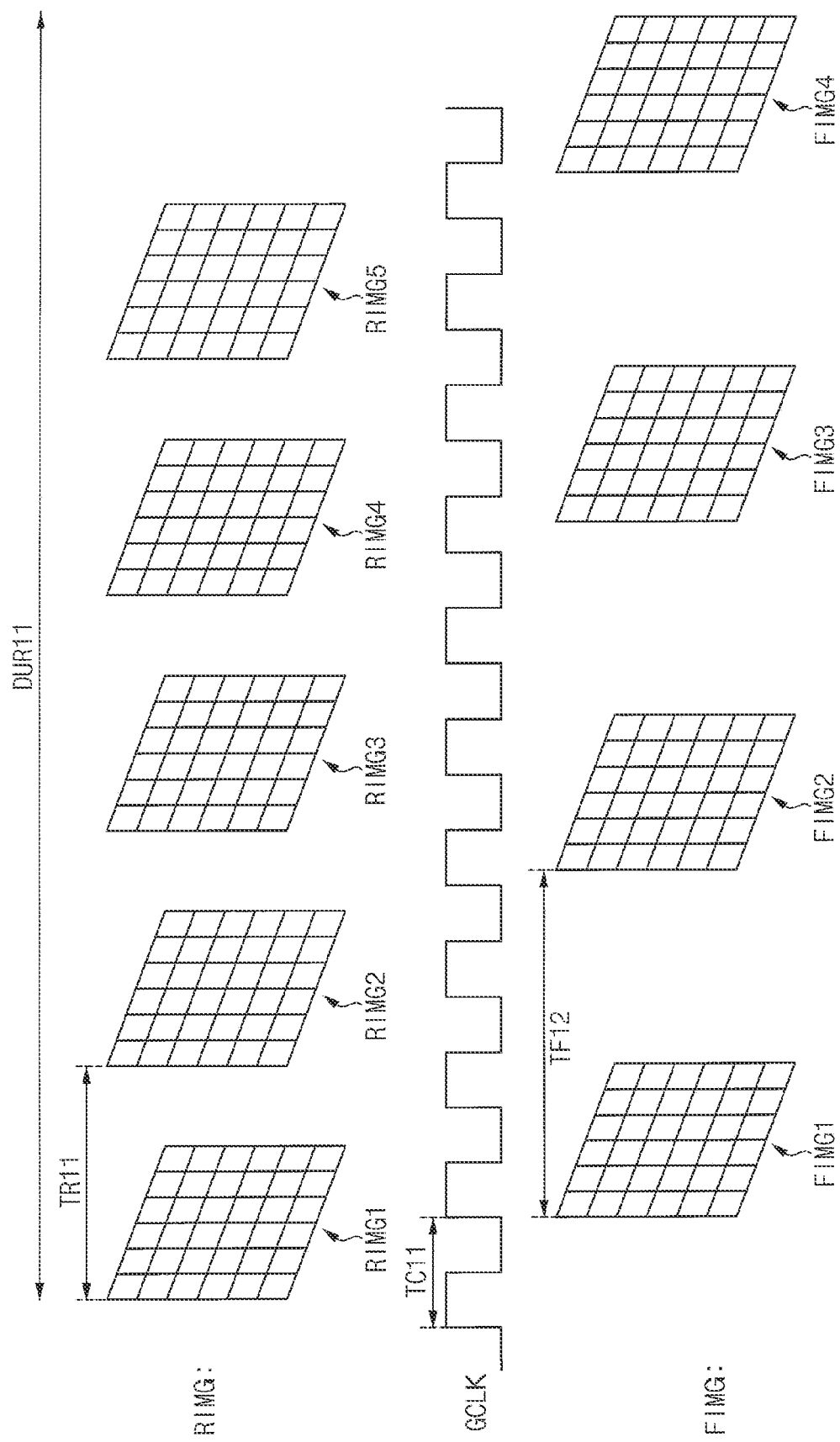

FIGS. 7, 8 and 9 are diagrams for describing an operation of an application processor according to example embodiments.

Referring to FIGS. 7, 8 and 9, examples for describing the performance control and the power control of the main processor 110 included in the application processor 102 are illustrated.

In FIGS. 7, 8 and 9, "RIMG" represents rendering images corresponding to the rendering data RDAT and for describing the rendering rate of the graphic processor 140. "FIMG" represents frame images corresponding to the frame data FDAT and for describing the frame rate of the display device 300. "GCLK" and "SCLK" represent the graphic driving clock signal GCLK and the system driving clock signal SCLK generated by the power management unit and clock management unit 150, respectively.

In some example embodiments, as illustrated in FIG. 7, when the rendering rate of the graphic processor 140 is slower than the frame rate of the display device 300, the main processor 110 may perform the performance control, based on the performance/power control signal PCONT generated based on the timing information TINF, such that the rendering rate of the graphic processor 140 is increased.

For example, during a first operation phase DUR11 in an initial operation time, the graphic processor 140 may generate rendering images RIMG1, RIMG2 and RIMG3 by performing the rendering operation at every time interval TR11, and the rendering rate of the graphic processor 140 may correspond to a reciprocal of the time interval TR11. The display device 300 may display frame images FIMG1, FIMG2 and FIMG3 corresponding to the rendering images RIMG1, RIMG2 and RIMG3 by performing the frame update at every time interval TF11, and the frame rate of the display device 300 may correspond to a reciprocal of the time interval TF11. The time interval TF11 may be shorter than the time interval TR11, and thus, the rendering rate of the graphic processor 140 may be slower than the frame rate of the display device 300.

As illustrated in FIG. 7, since the rendering rate of the graphic processor 140 is slower than the frame rate of the display device 300, there may be a problem where the operation of generating the rendering images by the graphic processor 140 is later than (or delayed with respect to) the operation of displaying the frame images by the display device 300. Thus, to solve such problem, it is necessary to increase the rendering rate to match the rendering rate with the frame rate. The main processor 110 may generate the performance/power control signal PCONT for increasing the rendering rate of the graphic processor 140 based on the timing information TINF and may perform the performance control based on the performance/power control signal PCONT such that the rendering rate of the graphic processor 140 is increased.

For example, during a second operation phase DUR12 subsequent to the first operation phase DUR11, the graphic processor 140 may generate rendering images RIMG4, RIMG5 and RIMG6 by performing the rendering operation at every time interval TR12 shorter than the time interval TR11, and the rendering rate of the graphic processor 140 may correspond to a reciprocal of the time interval TR12. The display device 300 may display frame images FIMG4, FIMG5 and FIMG6 corresponding to the rendering images RIMG4, RIMG5, and RIMG6 by performing the frame update, and the frame rate of the display device 300 may be maintained (e.g., may still correspond to the reciprocal of the time interval TF11). However, example embodiments are not limited thereto, and the frame rate may be changed.

For example, the rendering rate of the graphic processor 140 may be increased by increasing a frequency of a driving clock signal of the graphic processor 140. For example, the graphic driving clock signal GCLK supplied to the graphic processor 140 may have a first cycle TC11 in the first operation phase DUR11 and may have a second cycle TC12 in the second operation phase DUR12. As illustrated in FIG. 7, the second cycle TC12 may be shorter than the first cycle TC11 and, thus, a frequency of the graphic driving clock signal GCLK may be increased.

Although FIG. 7 illustrates an operation of improving or enhancing only the performance of the graphic processor 140, example embodiments are not limited thereto and an operation of improving the performance of a memory associated with or related to the graphic processor 140 may be performed.

In other example embodiments, as illustrated in FIG. 8, when the rendering rate of the graphic processor 140 is faster than the frame rate of the display device 300, the main processor 110 may perform the power control, based on the performance/power control signal PCONT generated based on the timing information TINF, such that the power consumption of the application processor 102 is reduced and/or the rendering rate of the graphic processor 140 is decreased.

For example, as with that described with reference to FIG. 7, during the first operation phase DUR11 in the initial operation time, the graphic processor 140 may generate the rendering images RIMG1, RIMG2 and RIMG3 by performing the rendering operation at every time interval TR11, and the rendering rate of the graphic processor 140 may correspond to the reciprocal of the time interval TR11. Unlike that described with reference to FIG. 7, during the first operation phase DUR11, the display device 300 may display the frame images FIMG1, FIMG2 and FIMG3 corresponding to the rendering images RIMG1, RIMG2 and RIMG3 by performing the frame update at every time interval TF12, and the frame rate of the display device 300 may correspond to a reciprocal of the time interval TF12. The time interval TF12 may be longer than the time interval TF11 and the time interval TR11, and thus, the rendering rate of the graphic processor 140 may be faster than the frame rate of the display device 300.

As illustrated in FIG. 8, since the rendering rate of the graphic processor 140 is faster than the frame rate of the display device 300, there may be a problem where the operation of generating the rendering images by the graphic processor 140 is earlier than the operation of displaying the frame images by the display device 300. Thus, to solve such problem, it is necessary to reduce the power consumption and/or decrease the rendering rate to match the rendering rate with the frame rate. The main processor 110 may generate the performance/power control signal PCONT for reducing the power consumption and/or decreasing the rendering rate based on the timing information TINF and may perform the power control based on the performance/power control signal PCONT such that the power consumption of the application processor 102 is reduced and/or the rendering rate of the graphic processor 140 is decreased.

For example, during a third operation phase DUR13 subsequent to the first operation phase DUR11, the graphic processor 140 may generate the rendering image RIMG4 by performing the rendering operation at every time interval TR13 longer than the time interval TR11, and the rendering rate of the graphic processor 140 may correspond to a reciprocal of the time interval TR13. The display device 300 may display the frame image FIMG4 corresponding to the rendering image RIMG4 by performing the frame update, and the frame rate of the display device 300 may be maintained. However, example embodiments are not limited thereto, and the frame rate may be changed.

For example, the power consumption of the application processor 102 may be reduced by decreasing the frequency of the driving clock signal of the graphic processor 140 and/or a frequency of a system clock signal of the application processor 102. For example, the graphic driving clock signal GCLK supplied to the graphic processor 140 and/or the system driving clock signal SCLK supplied to the application processor 102 may have the first cycle TC11 in the first operation phase DUR11 and may have a third cycle TC13 in the third operation phase DUR13. As illustrated in FIG. 8, the third cycle TC13 may be longer than the first cycle TC11 and, thus, the frequency of the graphic driving clock signal GCLK and/or the frequency of the system driving clock signal SCLK may be decreased.

In still other example embodiments, as illustrated in FIG. 9, even though the rendering rate of the graphic processor 140 is faster than the frame rate of the display device 300, the main processor 110 may not perform the performance control and/or the power control. For example, as will be described with reference to FIG. 11, when the display device 300 includes a plurality of frame buffers, a plurality of frame data corresponding to a plurality of frame images may be stored in the plurality of frame buffers. Thus, even though the operation of generating the rendering images by the graphic processor 140 is earlier than the operation of displaying the frame images by the display device 300, the rendering images may be transmitted to and stored in the display device 300 while the rendering rate of the graphic processor 140 is maintained.

Although example embodiments are described based on the examples where the rendering performance of the graphics processor 140 and/or the power consumption of the application processor 102 are controlled based on the timing information TINF, example embodiments are not limited thereto. For example, since the display device 300 operates based on the variable frame rate scheme, the frame rate of the display device 300 may be controlled or adjusted based on the timing information TINF. For example, the frame rate of the display device 300 may be decreased in the example of FIG. 7 or the frame rate of the display device 300 may be increased in the example of FIG. 8.

In the application processor 100 and the display system 200 according to example embodiments, the display controller 120 may provide the timing information TINF, which represents the currently displayed hardware states and/or conditions, to the main processor 110 and/or the operating system (e.g., software) executed by the main processor 110. Using the timing information TINF, the main processor 110 may change the frame rate of the display device 300 and may also perform the performance optimization (e.g., the rendering performance of the graphic processor 140) and/or the power optimization. Accordingly, the optimization for the variable frame rate scheme of the display device 300 may be supported and the fine-grained frame rate change may be implemented.

Figure 10:
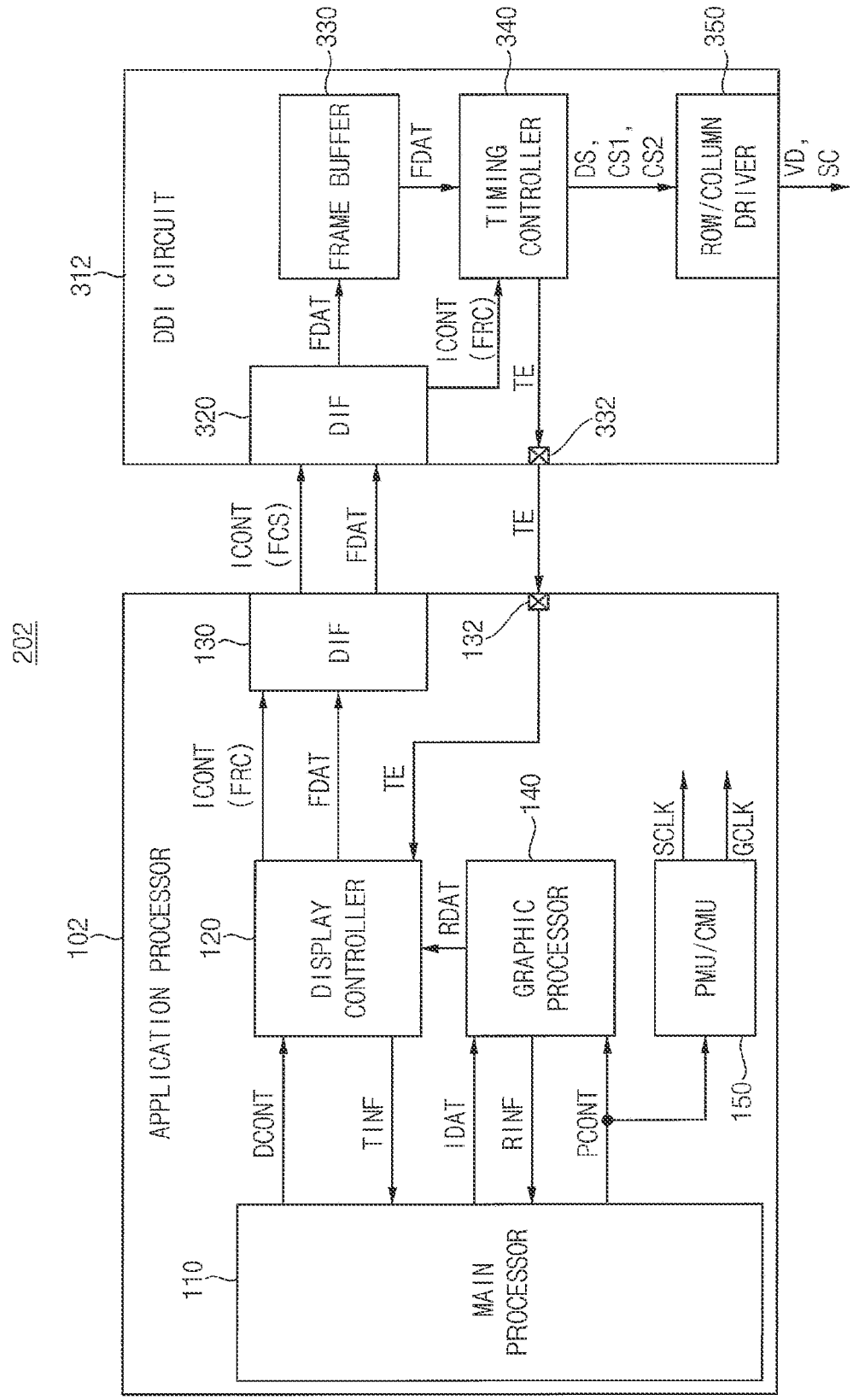
Figure 11:
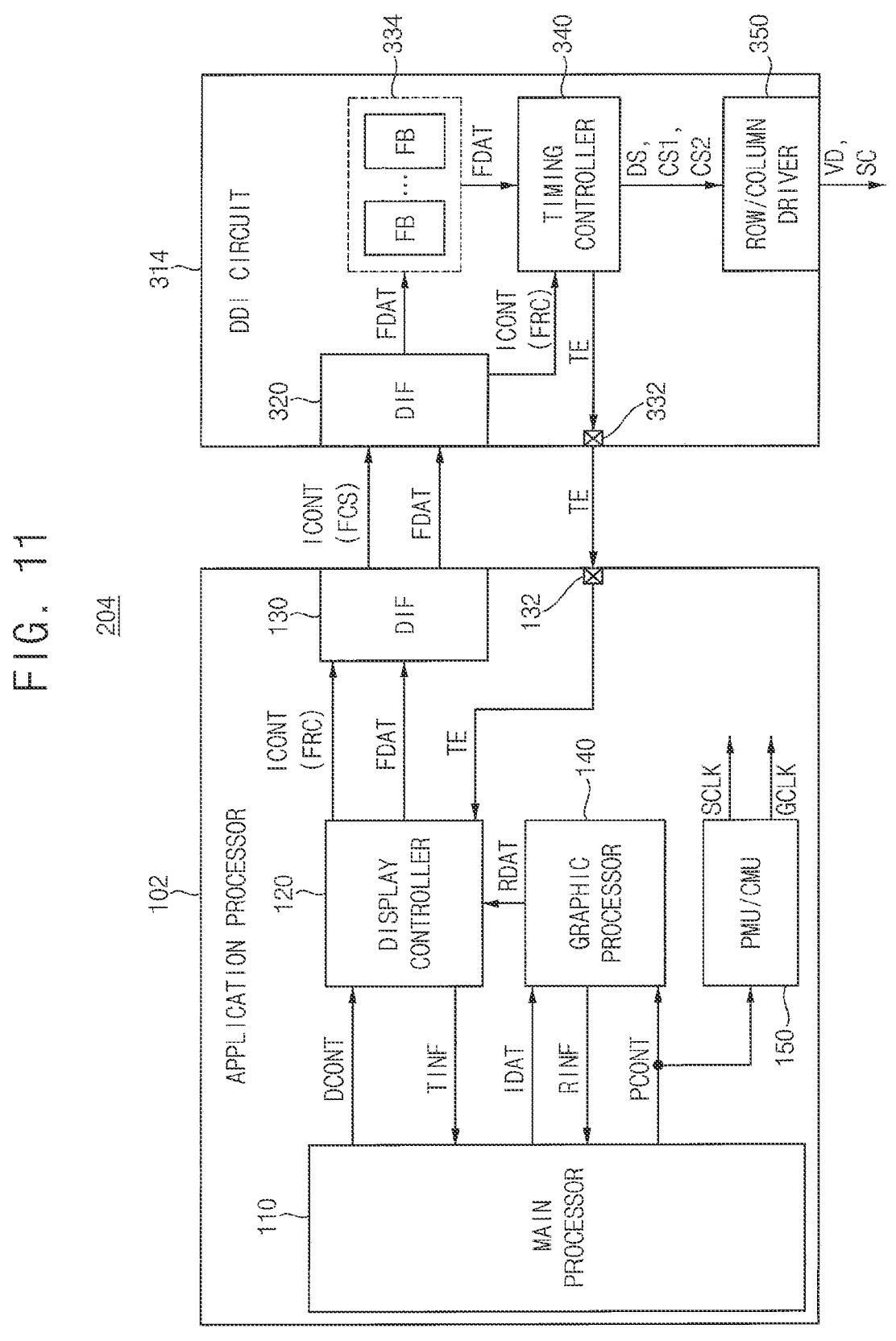

FIGS. 10 and 11 are block diagrams illustrating an application processor and a display system including the application processor according to example embodiments. The descriptions repeated with FIGS. 2 and 6 will be omitted.

Referring to FIG. 10, a display system 202 includes an application processor 102 and a display driver integrated circuit 312. For convenience of illustration, the display panel 360 in FIG. 2 is omitted.

The application processor 102 may include a main processor 110, a display controller 120, a display interface 130, a graphic processor 140, and a power management unit and clock management unit 150. The application processor 102 may further include a first pin 132. The application processor 102 may be substantially the same as the application processor 102 of FIG. 6.

The display driver integrated circuit 312 may include a display interface 320, a frame buffer 330, a timing controller 340 and a row/column driver 350. The display driver integrated circuit 312 may further include a second pin 322.

The display interface 320 may receive the control signal ICONT and the frame data FDAT from the application processor 102. For example, the display interface 320 may be implemented based on the display interface standard that is substantially the same as that of the display interface 130.

When the event signal TE is generated and provided outside the application processor 102 (e.g., from the display driver integrated circuit 312), the event signal TE may be transmitted from the display driver integrated circuit 312 to the application processor 102 through the first and second pins 132 and 322 and a first channel between the first and second pins 132 and 322. For example, the first and second pins 132 and 322 and the first channel may be formed individually, separately and/or independently from the display interfaces 130 and 320 and a second channel formed for the display interfaces 130 and 320. For example, a pin may represent a contact pad or a contact pin but may not be limited thereto. However, example embodiments are not limited thereto and the event signal TE may be generated and provided inside the application processor 102.

The frame buffer 330 may temporarily store a frame image and the frame data FDAT corresponding to the frame image. The display driver integrated circuit 312 may include one frame buffer 330, and the frame buffer 330 may store one frame image and frame data corresponding to the one frame image at one time (or at once).

The timing controller 340 may generate a first control signal CS1, a second control signal CS2 and a data signal DS based on the control signal ICONT and the frame data FDAT. The timing controller 340 may generate the event signal TE.

The row/column driver 350 may generate a plurality of data voltages VD and a plurality of scan signals SC that are provided to the display panel 360 based on the first control signal CS1, the second control signal CS2 and the data signal DS. The display panel 360 may display a frame image corresponding to the frame data FDAT based on the plurality of data voltages VD and the plurality of scan signals SC.

The display system 202 may operate as described with reference to FIGS. 7 and 8. For example, as illustrated in FIG. 7, when the rendering rate of the graphic processor 140 is slower than the frame rate of the display device 300, the main processor 110 may perform the performance control such that the rendering rate of the graphic processor 140 is increased. For example, as illustrated in FIG. 8, when the rendering rate of the graphics processor 140 is faster than the frame rate of the display device 300, the main processor 110 may perform the power control such that the power consumption of the application processor 102 is reduced and/or the rendering rate of the graphic processor 140 is decreased. However, example embodiments are not limited thereto, and the frame rate may be controlled based on the timing information TINF.

Referring to FIG. 11, a display system 204 includes an application processor 102 and a display driver integrated circuit 314.

The display system 204 may be substantially the same as the display system 202 of FIG. 10, except that a configuration of the display driver integrated circuit 314 is partially changed. The descriptions repeated with FIG. 10 will be omitted.

The display driver integrated circuit 314 may include a display interface 320, a plurality of frame buffers (FB) 334, a timing controller 340, and a row/column driver 350. The display driver integrated circuit 314 may further include a second pin 322.

The plurality of frame buffers 334 may temporarily store frame images and frame data FDAT corresponding to the frame images. The display driver integrated circuit 314 may include two or more frame buffers 334. Since one frame buffer stores one frame image and frame data corresponding to the one frame image at one time, the plurality of frame buffers 334 may simultaneously store a plurality of frame images and frame data corresponding to the plurality of frame images.

The display system 204 may operate as described with reference to FIGS. 7 and 8 and may also operate as described with reference to FIG. 9. For example, as illustrated in FIG. 9, even though the rendering rate of the graphics processor 140 is faster than the frame rate of the display device 300, the main processor 110 may maintain the rendering rate of the graphics processor 140 and the display driver integrated circuit 314 may store the plurality of frame images and frame data corresponding to the plurality of frame images that are received from the application processor 102 in the plurality of frame buffers 334.

Figure 12:
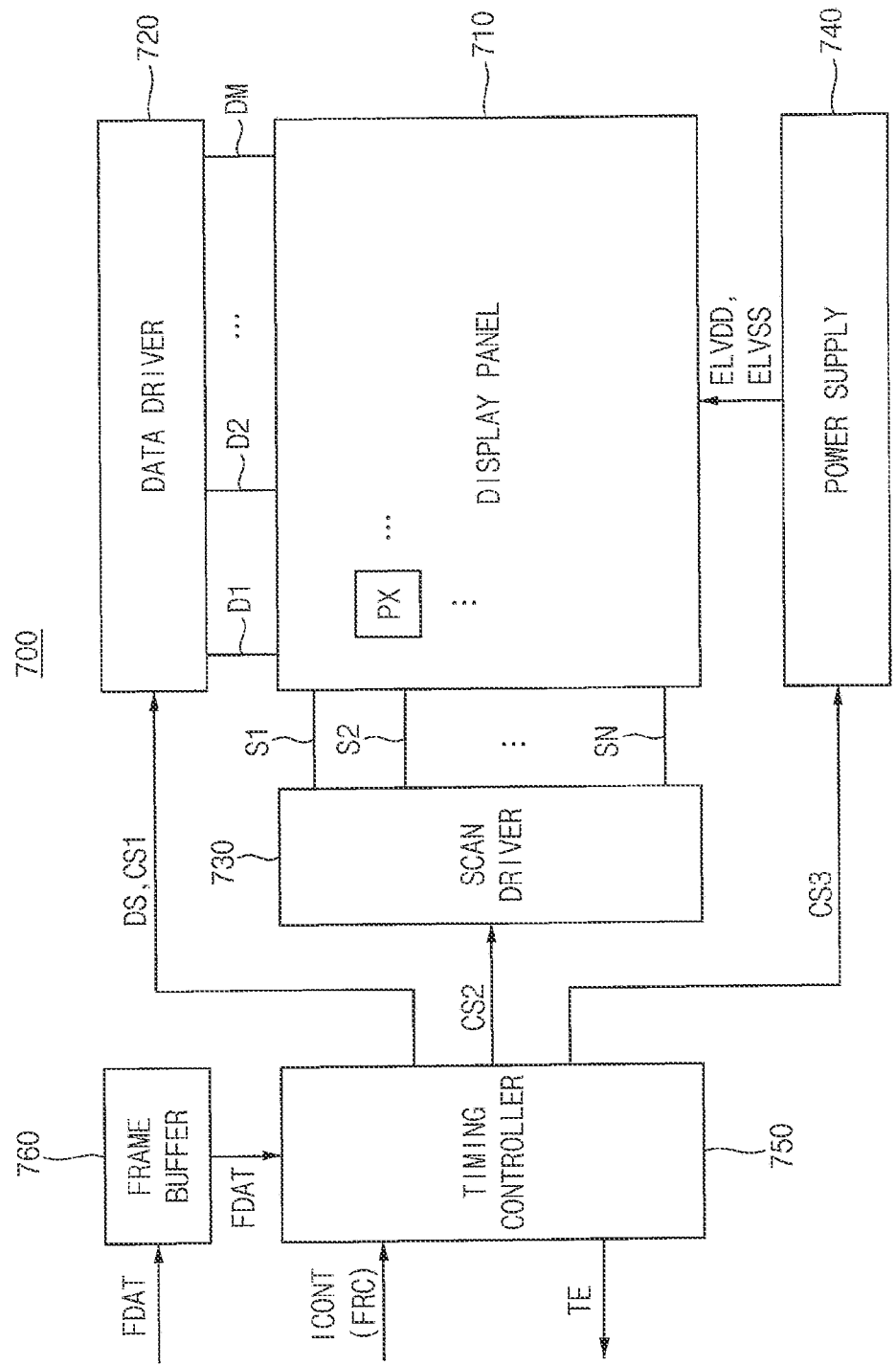
FIG. 12 is a block diagram illustrating an example of a display device included in a display system according to example embodiments.

FIG. 12 is a block diagram illustrating an example of a display device included in a display system according to example embodiments.

Referring to FIG. 12, a display device 700 includes a display panel 710 and a display driver integrated circuit. The display driver integrated circuit may include a data driver 720, a scan driver 730, a power supply 740, a timing controller 750, and a frame buffer 760.

The display panel 710 may operate (e.g., displays frame images) based on frame data FDAT. The display panel 710 may be connected to the data driver 720 through a plurality of data lines D1, D2, . . . , DM, and may be connected to the scan driver 730 through a plurality of scan lines S1, S2, . . . , SN. The plurality of data lines D1, D2, . . . , DM may extend in a first direction, and the plurality of scan lines S1, S2, . . . , SN may extend in a second direction crossing (e.g., substantially perpendicular to) the first direction.

The display panel 710 may include a plurality of pixels PX that are arranged in a matrix formation having a plurality of rows and a plurality of columns. As will be described with reference to FIG. 13, each of the plurality of pixels PX may include a light emitting element and at least one transistor for driving the light emitting element. Each of the plurality of pixels PX may be electrically connected to a respective one of the plurality of data lines D1, D2, . . . , DM and a respective one of the plurality of scan lines S1, S2, . . . , SN.

In some example embodiments, the display panel 710 may be a display panel that operates based on the variable frame rate scheme and is controlled by the application processor according to example embodiments.

In some example embodiments, the display panel 710 may be a self-emitting display panel that emits light without the use of a backlight unit. For example, the display panel 710 may be an organic light emitting display panel that includes an organic light emitting diode (OLED) as the light emitting element.

In some example embodiments, each of the plurality of pixels PX included in the display panel 710 may have various configurations depending on a driving scheme of the display device 700. For example, the display device 700 may be driven with an analog or a digital driving scheme. While the analog driving scheme produces grayscale using variable voltage levels corresponding to input data, the digital driving scheme produces grayscale using a variable time duration in which the light emitting diode emits light. The analog driving scheme is difficult to implement because it requires a driving integrated circuit (IC) that is complicated to manufacture if the display is large and has high resolution. The digital driving scheme, on the other hand, may accomplish the required high resolution through a simpler IC structure. An example of each of the plurality of pixels PX will be described with reference to FIG. 13.

The frame buffer 760 may receive the frame data FDAT from the application processor 100, may temporarily store the frame data FDAT, and may output the frame data FDAT. Although FIG. 12 illustrates only one frame buffer 760 for convenience of illustration, example embodiments are not limited thereto. For example, as described with reference to FIGS. 10 and 11, the number of frame buffers may be variously determined according to example embodiments.

The timing controller 750 may control overall operations of the display device 700. For example, the timing controller 750 may receive the control signal ICONT including the frame rate control signal FCS from the application processor 100 and may provide predetermined control signals CS1, CS2 and CS3 to the data driver 720, the scan driver 730, and the power supply 740 based on the control signal ICONT to control the operations of the display device 700. For example, the control signals CS1, CS2 and CS3 may include a vertical synchronization signal and a horizontal synchronization signal that are used inside the display device 700.

The timing controller 750 may receive the frame data FDAT, which is received from the application processor 100, from the frame buffer 760 and may generate a data signal DS for displaying the frame images based on the frame data FDAT. For example, the frame data FDAT may include red image data, green image data, and blue image data. In addition, the frame data FDAT may further include white image data. Alternatively, the frame data FDAT may include magenta image data, yellow image data, cyan image data, or the like.

Further, the timing controller 750 may generate the event signal TE and may transmit the event signal TE to the application processor 100.

The data driver 720 may generate a plurality of data voltages based on the control signal CSI and the data signal DS and may apply the plurality of data voltages to the display panel 710 through the plurality of data lines D1, D2, . . . , DM. For example, the data driver 720 may include a digital-to-analog converter (DAC) that converts the data signal DS in a digital form into the plurality of data voltages in an analog form.

The scan driver 730 may generate a plurality of scan signals based on the control signal CS2 and may apply the plurality of scan signals to the display panel 710 through the plurality of scan lines S1, S2, . . . , SN. The plurality of scan lines S1, S2, . . . , SN may be sequentially activated based on the plurality of scan signals.

The frame buffer 760 may correspond to the frame buffers 330 and 334 in FIGS. 10 and 11, the timing controller 750 may correspond to the timing controller 340 in FIGS. 10 and 11, and the data driver 720 and the scan driver 730 may correspond to the row/column driver 350 in FIGS. 10 and 11.

In some example embodiments, the data driver 720, the scan driver 730, and the timing controller 750 may be implemented as one integrated circuit. In other example embodiments, the data driver 720, the scan driver 730, and the timing controller 750 may be implemented as two or more integrated circuits. A driving module including at least the timing controller 750 and the data driver 720 may be referred to as a timing controller embedded data driver (TED).

The power supply 740 may supply a first power supply voltage ELVDD and a second power supply voltage ELVSS to the display panel 710 based on the control signal CS3. For example, the first power supply voltage ELVDD may be a high power supply voltage, and the second power supply voltage ELVSS may be a low power supply voltage.

In some example embodiments, at least some of the elements included in the display driver integrated circuit may be disposed, e.g., directly mounted, on the display panel 710 or may be connected to the display panel 710 in a tape carrier package (TCP) type. Alternatively, at least some of the elements included in the display driver integrated circuit may be integrated on the display panel 710. In some example embodiments, the elements included in the display driver integrated circuit may be respectively implemented with separate circuits/modules/chips. In other example embodiments, on the basis of a function, some of the elements included in the display driver integrated circuit may be combined into one circuit/module/chip or may be further separated into a plurality of circuits/modules/chips.

Figure 13:
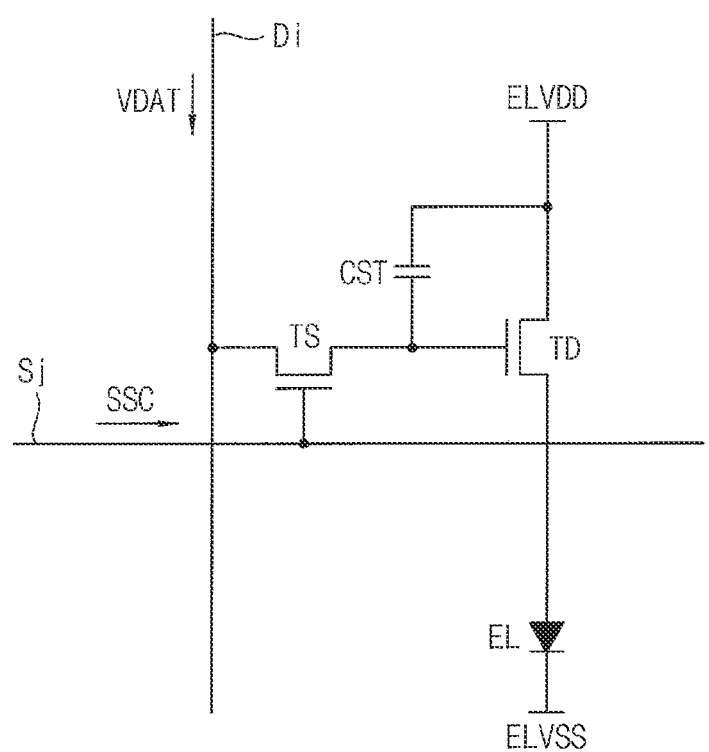
FIG. 13 is a circuit diagram illustrating an example of a pixel included in a display panel included in a display device of FIG. 12.

FIG. 13 is a circuit diagram illustrating an example of a pixel included in a display panel included in a display device of FIG. 12.

Referring to FIG. 13, each pixel PX may include a switching transistor TS, a storage capacitor CST, a driving transistor TD and an organic light emitting diode EL.

The switching transistor TS may have a first electrode connected to a data line Di, a second electrode connected to the storage capacitor CST, and a gate electrode connected to a scan line Sj. The switching transistor TS may transfer a data voltage VDAT received from the data driver 720 to the storage capacitor CST in response to a scan signal SSC received from the scan driver 730. The scan signal SSC may be one of the plurality of scan signals SC in FIGS. 10 and 11.

The storage capacitor CST may have a first electrode connected to the first power supply voltage ELVDD and a second electrode connected to a gate electrode of the driving transistor TD. The storage capacitor CST may store the data voltage VDAT transferred through the switching transistor TS. The data voltage VDAT may be one of the plurality of data voltages VD in FIGS. 10 and 11.

The driving transistor TD may have a first electrode connected to the first power supply voltage ELVDD, a second electrode connected to the organic light emitting diode EL, and the gate electrode connected to the storage capacitor CST. The driving transistor TD may be turned on or off depending on the data voltage VDAT stored in the storage capacitor CST.

The organic light emitting diode EL may have an anode electrode connected to the driving transistor TD and a cathode electrode connected to the second power supply voltage ELVSS. The organic light emitting diode EL may emit light based on a current flowing from the first power supply voltage ELVDD to the second power supply voltage ELVSS while the driving transistor TD is turned on. The brightness of the pixel PX may increase as the current flowing through the organic light emitting diode EL increases.

Although FIG. 13 illustrates an organic light emitting diode pixel as an example of each pixel PX that may be included in the display panel 710, it would be understood that example embodiments are not limited to the organic light emitting diode pixel and example embodiment may be applied to any pixels of various types and configurations.

Figure 14:
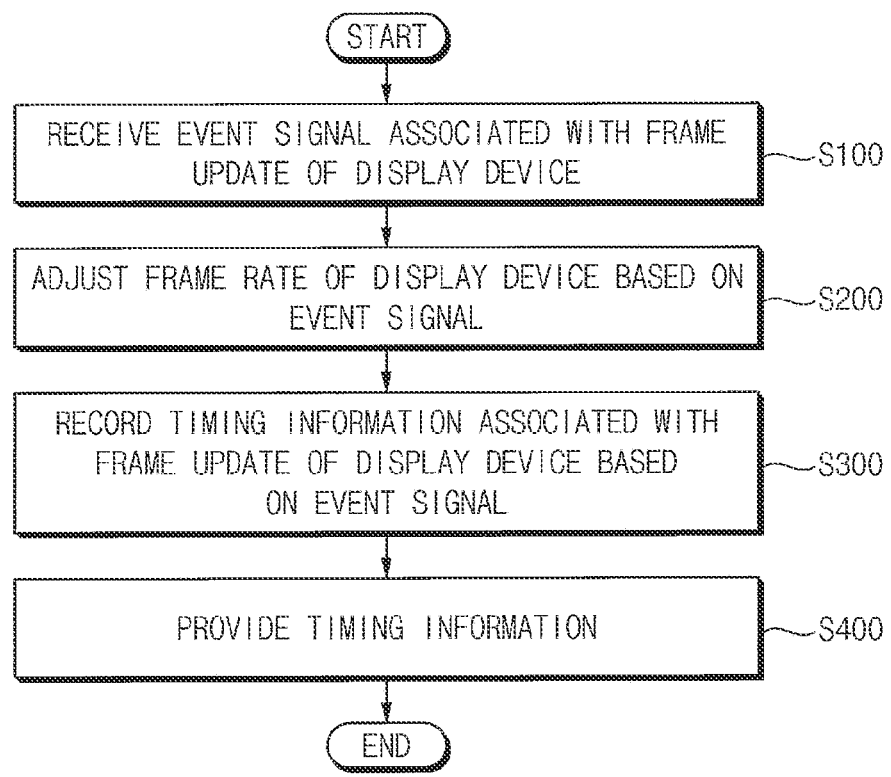
FIG. 14 is a flowchart illustrating a method of operating an application processor according to example embodiments.

FIG. 14 is a flowchart illustrating a method of operating an application processor according to example embodiments.

Referring to FIGS. 1, 2 and 14, in a method of operating an application processor according to example embodiments, the display controller 120 receives the event signal TE associated with the frame update of the display device 300 (step S100) and adjusts the frame rate of the display device 300 based on the event signal TE (step S200). For example, the event signal TE may be generated and provided outside (e.g., the display device 300) or inside the application processor 100. For example, steps S100 and S200 may be performed as described with reference to FIGS. 3 and 5.

The display controller 120 records the timing information TINF associated with the frame update of the display device 300 based on the event signal TE (step S300) and provides the timing information TINF to the main processor 110 (step S400). For example, step S300 may be performed as described with reference to FIGS. 4 and 5, which will be described with reference to FIG. 15.

Figure 15:
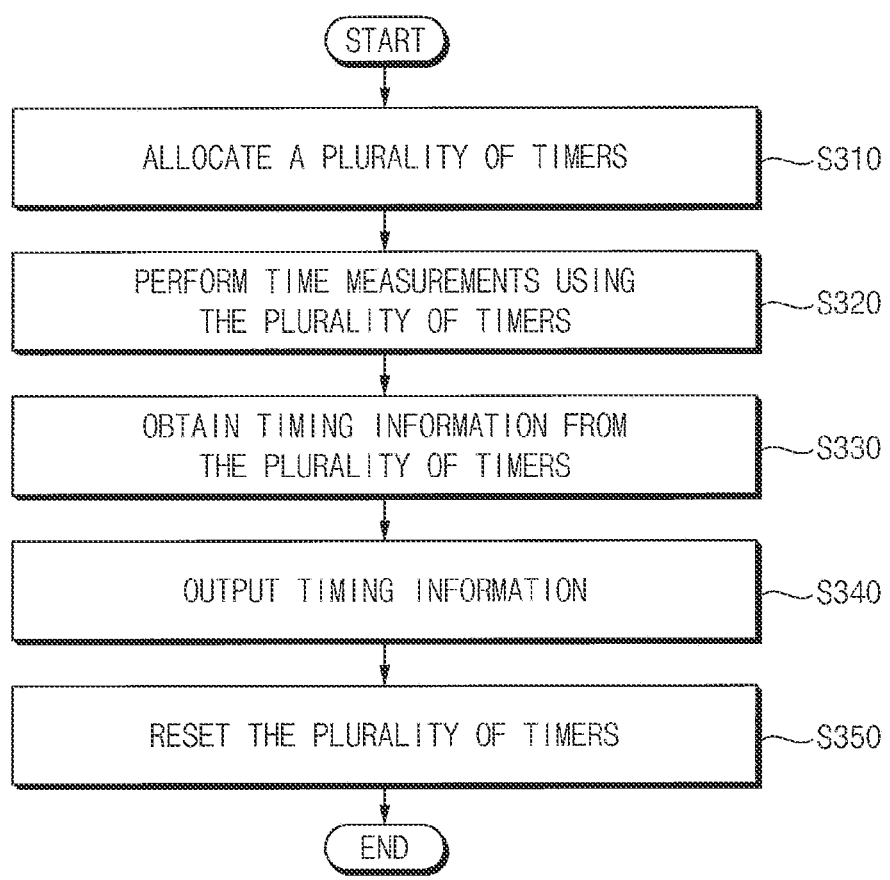
FIG. 15 is a flowchart illustrating an example of recording timing information in FIG. 14.

FIG. 15 is a flowchart illustrating an example of recording timing information in FIG. 14.

Referring to FIGS. 4, 5, 14 and, 15, when recording the timing information TINF (step S300), the frame rate control logic 126 may allocate the timers TMR1, TMR2 and TMR3 to different sub-intervals (step S310), may perform the time measurements using the timers TMR1, TMR2 and TMR3 (step S320), may read and/or obtain the timing information TINF recorded in the timers TMR1, TMR2 and TMR3 (step S330), may output the timing information TINF to the main processor 110 (step S340), and may reset the timers TMR1, TMR2 and TMR3 (step S350).

Figure 16:
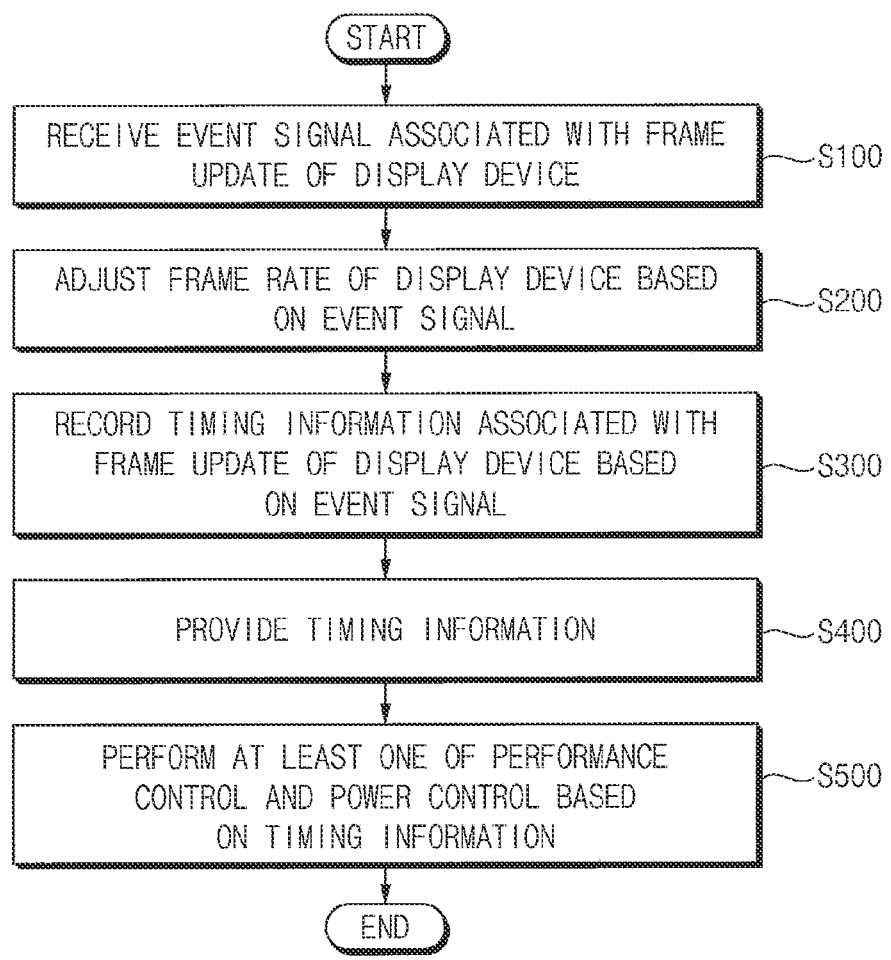
FIG. 16 is a flowchart illustrating a method of operating an application processor according to example embodiments.

FIG. 16 is a flowchart illustrating a method of operating an application processor according to example embodiments. The descriptions repeated with FIG. 14 will be omitted.

Referring to FIGS. 6 and 16, in a method of operating an application processor according to example embodiments, steps S100, S200, S300 and S400 may be substantially the same as steps S100, S200, S300 and S400 in FIG. 14, respectively.

The main processor 110 may perform the at least one of the performance control and the power control based on the timing information TINF (step S500). For example, step S500 may be performed as described with reference to FIGS. 7 through 9, which will be described with reference to FIGS. 17 and 18.

Figure 17:
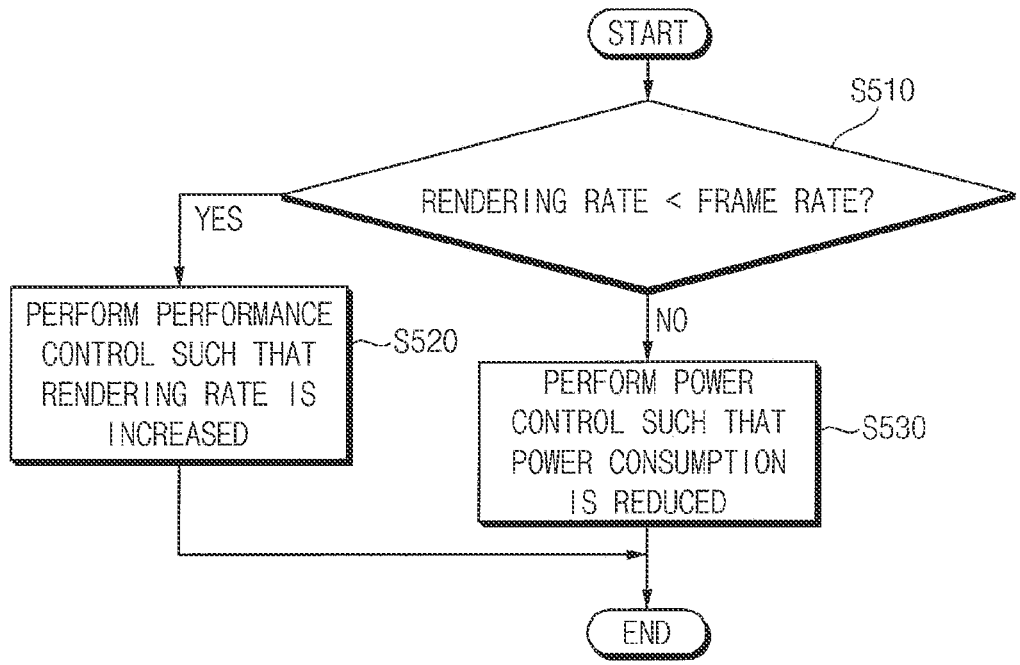
FIGS. 17 and 18 are flowcharts illustrating examples of performing at least one of a performance control and a power control in FIG. 16.
Figure 18:
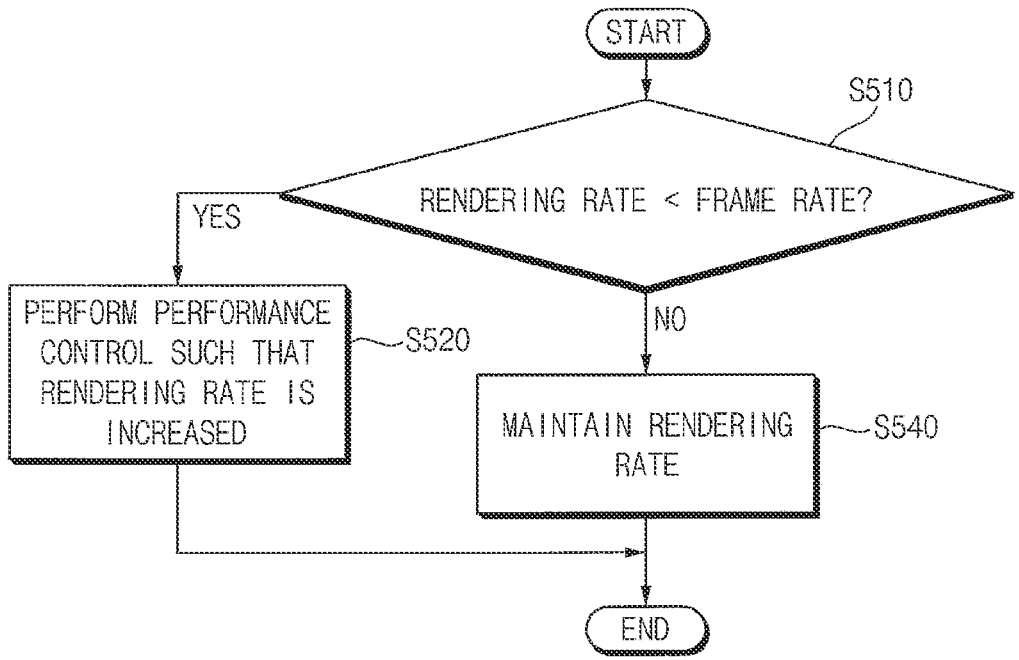

FIGS. 17 and 18 are flowcharts illustrating examples of performing at least one of a performance control and a power control in FIG. 16.

Referring to FIGS. 6, 7, 8, 16 and 17, when performing the at least one of the performance control and the power control (step S500), when the rendering rate of the graphic processor 140 is slower than the frame rate of the display device 300 (step S510: YES), the main processor 110 may perform the performance control such that the rendering rate of the graphic processor 140 is increased (step S520). When the rendering rate of the graphic processor 140 is faster than the frame rate of the display device 300 (step S510: NO), the main processor 110 may perform the power control such that the power consumption of the application processor 102 is reduced and/or the rendering rate of the graphic processor 140 is decreased (step S530).

Referring to FIGS. 6, 7, 9, 16 and 18, when performing the at least one of the performance control and the power control (step S500), steps S510 and S520 may be substantially the same as steps S510 and S520 in FIG. 17, respectively. When the rendering rate of the graphic processor 140 is faster than the frame rate of the display device 300 (step S510: NO), the main processor 110 may maintain the rendering rate of the graphic processor 140 (step S540).

As will be appreciated by those skilled in the art, the disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

FIG. 19 is a block diagram illustrating an electronic system including a display system according to example embodiments.

Referring to FIG. 19, an electronic system 1000 may be implemented as a data processing device that uses or supports a mobile industry processor interface (MIPI). The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185, and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls operations of the image sensor 1140 and the display device 1150.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In some example embodiments, the DSI host 1111 may include a serializer (SER), and the DSI device 1151 may include a deserializer (DES). In some example embodiments, the CSI host 1112 may include a deserializer (DES), and the CSI device 1141 may include a serializer (SER).

The application processor 1110 may be the application processor according to example embodiments and may operate based on the method of operating the application processor according to example embodiments. The application processor 1110 and the DSI device 1151 may form the display system according to example embodiments, and the DSI device 1151 may be the display driver integrated circuit included in the display system according to example embodiments.

The disclosure may be applied to various electronic devices and systems that include the display devices and the display systems. For example, the disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like.

The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed and that modifications to the disclosed example embodiments, as well as other example embodiments, are intended to be included within the scope of the appended claims.

What is claimed is:

1. An application processor comprising:
   a main processor; and
   a display controller controlled by the main processor, comprising:
      a trigger control logic,
      a display timer logic including a plurality of timers, and
      a frame rate control logic configured to control start timings and end timings of the plurality of timers;
   wherein the display controller is configured to:
      control a display device that is located outside the application processor and operates based on a variable frame rate scheme,
      receive, at the trigger control logic, an event signal associated with a frame update of the display device,
      adjust, by the frame rate control logic, a frame rate of the display device based on the event signal,
      record, by the display timer logic, timing information associated with the frame update of the display device based on the event signal, and
      provide, by the frame rate control logic, the timing information to the main processor,
   wherein one frame interval during which the display device displays one frame image is divided into a plurality of sub-intervals, and
   the frame rate control logic is configured to allocate each of the plurality of timers to at least one of the plurality of sub-intervals such that the plurality of timers measures lengths of different sub-intervals.

2. The application processor of claim 1, wherein:
   a first timer among the plurality of timers is allocated to measure a length of a first sub-interval among the plurality of sub-intervals,
   a time measurement using the first timer is initiated at a start time point of the first sub-interval, and
   the time measurement using the first timer is finished at an end time point of the first sub-interval.

3. The application processor of claim 1, wherein the main processor is configured to perform at least one of a performance control and a power control based on the timing information.

4. The application processor of claim 3, further comprising:
   a graphic processor configured to render frame images displayed on the display device, wherein
   the main processor is configured to perform the at least one of the performance control and the power control by comparing the timing information with rendering information of the graphic processor.

5. The application processor of claim 4, wherein in response to a rendering rate of the graphic processor being slower than the frame rate of the display device, the main processor is configured to perform the performance control such that the rendering rate of the graphic processor is increased.

6. The application processor of claim 5, wherein the rendering rate of the graphic processor is increased by increasing a frequency of a driving clock signal of the graphic processor.

7. The application processor of claim 4, wherein in response to a rendering rate of the graphic processor being faster than the frame rate of the display device, the main processor is configured to perform the power control such that power consumption of the application processor is reduced.

8. The application processor of claim 7, wherein the power consumption of the application processor is reduced by decreasing a frequency of a driving clock signal of the graphic processor or a frequency of a system clock signal of the application processor.

9. The application processor of claim 1, further comprising a display interface for a communication with the display device.

10. A display system comprising:
    a display device configured to operate based on a variable frame rate scheme; and
    an application processor configured to communicate with the display device, wherein:
    the application processor includes:
       a main processor; and
       a display controller controlled by the main processor comprising:
          a trigger control logic,
          a display timer logic including a plurality of timers, and
          a frame rate control logic configured to control start timings and end timings of the plurality of timers;
    wherein the display controller is configured to:
       control the display device,
       receive, at the trigger control logic, an event signal associated with a frame update of the display device,
       adjust, by the frame rate control logic, a frame rate of the display device based on the event signal,
       record, by the display timer logic, timing information associated with the frame update of the display device based on the event signal, and provide, but the frame rate control logic, the timing information to the main processor, wherein one frame interval during which the display device displays one frame image is divided into a plurality of sub-intervals, and the frame rate control logic is configured to allocate each of the plurality of timers to at least one of the plurality of sub-intervals such that the plurality of timers measures lengths of different sub-intervals.

11. The display system of claim 10, wherein:
the application processor further includes a graphic processor configured to render frame images displayed on the display device, and
the main processor is configured to perform at least one of a performance control and a power control by comparing the timing information with rendering information of the graphic processor.

12. The display system of claim 11, wherein:
the display device includes one frame buffer configured to store the frame images, and
in response to a rendering rate of the graphic processor being faster than the frame rate of the display device, the main processor is configured to perform the power control such that the rendering rate of the graphic processor is decreased and power consumption of the application processor is reduced.

13. The display system of claim 11, wherein:
the display device includes two or more frame buffers configured to store the frame images, and
in response to a rendering rate of the graphic processor being faster than the frame rate of the display device, the main processor is configured to maintain the rendering rate of the graphic processor.

14. The display system of claim 11, wherein in response to a rendering rate of the graphic processor being slower than the frame rate of the display device, the main processor is configured to perform the performance control such that the rendering rate of the graphic processor is increased.

15. The display system of claim 10, wherein the display device includes:
a display panel configured to display frame images; and
a display driver integrated circuit configured to control an operation of the display panel and to generate the event signal.

16. The display system of claim 15, wherein the display driver integrated circuit includes:
a timing controller configured to generate a first control signal, a second control signal, and a data signal based on an input control signal and frame data and to generate the event signal; and
a row/column driver configured to generate a plurality of data voltages and a plurality of scan signals that are provided to the display panel based on the first control signal, the second control signal, and the data signal.

17. The display system of claim 15, wherein the display panel includes an organic light emitting display panel.

18. An application processor comprising:
a main processor configured to generate image data;
a graphic processor configured to generate rendering data by rendering the image data and to generate rendering information associated with a rendering operation; and
a display controller controlled by the main processor, comprising:
a trigger control logic,
a display timer logic including a plurality of timers, and
a frame rate control logic configured to control start timings and end timings of the plurality of timers
wherein:
the display controller is configured to:
control a display device that is located outside the application processor and operates based on a variable frame rate scheme,
generate frame data based on the rendering data,
transmit the frame data to the display device,
receive, at the trigger control logic, an event signal associated with a frame update of the display device from the display device,
generate, by the frame rate control logic, a frame rate control signal used to adjust a frame rate of the display device based on an event signal, wherein one frame interval during which the display device displays one frame image is divided into a plurality of sub-intervals,
transmit the frame rate control signal to the display device,
record, by the display timer logic, timing information associated with the frame update of the display device based on the event signal,
allocate, by the frame rate control logic, each of the plurality of timers to at least one of the plurality of sub-intervals such that the plurality of timers measures lengths of different sub-intervals, and
provide, by the frame rate control logic, the timing information to the main processor,
the main processor is configured to generate a performance/power control signal used to perform at least one of a performance control and a power control by comparing the timing information with the rendering information,
in response to a rendering rate of the graphic processor being slower than the frame rate of the display device, the main processor is configured to perform the performance control such that the rendering rate of the graphic processor is increased, and
in response to the rendering rate of the graphic processor being faster than the frame rate of the display device, the main processor is configured to perform the power control such that power consumption of the application processor is reduced.

* * * * *